United States Patent
Grimard et al.

(10) Patent No.: US 11,717,967 B2
(45) Date of Patent: Aug. 8, 2023

(54) SYSTEM AND METHOD FOR SCANNING AN OBJECT USING AN ARRAY OF ULTRASONIC TRANSDUCERS

(71) Applicant: TECSCAN SYSTEMS INC., Sr-Bruno-de-Montarville (CA)

(72) Inventors: Nicolas Grimard, Boucherville (CA); Rene Sicard, Chambly (CA); Sam H. Serhan, Brossard (CA)

(73) Assignee: TECSCAN SYSTEMS INC., Saint-Bruno-de-Montarville (CA)

( * ) Notice: Subject to any disclaimer, the term of this patent is extended or adjusted under 35 U.S.C. 154(b) by 70 days.

(21) Appl. No.: 17/524,529

(22) Filed: Nov. 11, 2021

(65) Prior Publication Data

US 2022/0281107 A1    Sep. 8, 2022

Related U.S. Application Data

(60) Provisional application No. 63/156,692, filed on Mar. 4, 2021.

(51) Int. Cl.
*B25J 9/16* (2006.01)
*G01N 29/265* (2006.01)
(Continued)

(52) U.S. Cl.
CPC ......... *B25J 9/1664* (2013.01); *B25J 15/0019* (2013.01); *G01N 29/04* (2013.01);
(Continued)

(58) Field of Classification Search
CPC .... B25J 9/1664; B25J 15/0019; B25J 9/1679; G01N 29/04; G01N 29/043; G01N 29/265;
(Continued)

(56) References Cited

U.S. PATENT DOCUMENTS 3,608,361 A    9/1971    Krautkramer et al.
3,958,451 A    5/1976    Richardson
(Continued)

FOREIGN PATENT DOCUMENTS

CA    2790481 A1    3/2013
CA    2820732 A1    12/2014
(Continued)

OTHER PUBLICATIONS

TecScan3D™: 3D Ultrasonic Scanner, Jun. 5, 2012.
(Continued)

*Primary Examiner* — Jacques M Saint Surin
(74) *Attorney, Agent, or Firm* — BCF LLP

(57) ABSTRACT

A plan for scanning an object using an array of ultrasonic transducers is prepared by identifying one or more enabled transducers for each of a plurality of selected grid positions defined on a surface of the object. The identification is made considering a direction of incidence of a planned ultrasonic signal emitted by each transducer, considering the array being positioned at each of the selected positions, and considering a surface normal vector at a grid position that would be impinged by the planned ultrasonic signal. The scan plan is complete when all grid positions defined on the surface of the array are covered by moving the array to all of the selected grid positions. The scan plan is executed by moving the array according to the scan plan while collecting, by the transducers enabled at each selected grid position, eventual responses to the ultrasonic signals from their respective grid positions.

22 Claims, 27 Drawing Sheets

(51) Int. Cl.
*G01N 29/04* (2006.01)
*B25J 15/00* (2006.01)

(52) U.S. Cl.
CPC ......... *G01N 29/043* (2013.01); *G01N 29/265* (2013.01); *G01N 2291/106* (2013.01)

(58) Field of Classification Search
CPC ........... G01N 29/262; G01N 2291/044; G01N 2291/106; G05B 2219/40613
USPC ......................................................... 73/447
See application file for complete search history.

(56) References Cited

U.S. PATENT DOCUMENTS

| | | | |
|---|---|---|---|
| 4,058,001 A | 11/1977 | Waxman | |
| 4,362,058 A | 12/1982 | Abele | |
| 4,389,893 A | 6/1983 | Ophir et al. | |
| 4,545,251 A | 10/1985 | Uchida | |
| 4,594,896 A | 6/1986 | Cardoso et al. | |
| 4,660,419 A | 4/1987 | Derkacs et al. | |
| 5,024,093 A | 6/1991 | Sasaki et al. | |
| 5,042,305 A | 8/1991 | Takishita | |
| 5,107,844 A | 4/1992 | Kami et al. | |
| 5,119,678 A | 6/1992 | Bashyam et al. | |
| 5,257,624 A | 11/1993 | Fraser et al. | |
| 5,383,366 A | 1/1995 | Wallingford | |
| 5,476,010 A | 12/1995 | Fleming et al. | |
| 5,524,626 A | 6/1996 | Liu et al. | |
| 5,557,456 A | 9/1996 | Garner | |
| 5,579,768 A | 12/1996 | Klesenski | |
| 5,644,512 A | 7/1997 | Chernoff et al. | |
| 5,831,157 A | 11/1998 | Woodmansee et al. | |
| 5,898,590 A | 4/1999 | Wampler et al. | |
| 5,940,123 A | 8/1999 | Daigle et al. | |
| 6,009,755 A | 1/2000 | Manome et al. | |
| 6,115,326 A * | 9/2000 | Puma ........................ | G01S 5/18 367/128 |
| 6,120,446 A | 9/2000 | Ji et al. | |
| 6,122,967 A | 9/2000 | Sword | |
| 6,364,835 B1 | 4/2002 | Hossack et al. | |
| 6,487,910 B1 | 12/2002 | Leybovich | |
| 6,611,617 B1 | 8/2003 | Crampton | |
| 7,181,970 B2 | 2/2007 | Haase et al. | |
| 7,343,019 B2 | 3/2008 | Hankins et al. | |
| 7,645,236 B2 | 1/2010 | Simopoulos et al. | |
| 7,689,032 B2 | 3/2010 | Strassenburg-Kleciak | |
| 7,833,159 B2 | 11/2010 | Ahn et al. | |
| 8,087,298 B1 | 1/2012 | Dimambro et al. | |
| 8,171,771 B2 | 5/2012 | Hain et al. | |
| 8,205,500 B2 | 6/2012 | Wu et al. | |
| 8,371,171 B2 | 2/2013 | Isobe et al. | |
| 8,403,855 B2 | 3/2013 | Lee et al. | |
| 8,413,515 B2 | 4/2013 | Isobe et al. | |
| 8,605,983 B2 | 12/2013 | Weston et al. | |
| 8,683,865 B2 | 4/2014 | Steinhoff et al. | |
| 8,791,792 B2 * | 7/2014 | Benkley, III ....... | G06V 40/1329 324/671 |
| 9,651,525 B2 | 5/2017 | Grimard et al. | |
| 10,041,828 B2 | 8/2018 | Broussais-Colella et al. | |
| 10,338,036 B2 | 7/2019 | Grimard et al. | |
| 2002/0062077 A1 | 5/2002 | Emmenegger et al. | |
| 2002/0102023 A1 | 8/2002 | Yamauchi | |
| 2004/0107080 A1 | 6/2004 | Deichmann et al. | |
| 2005/0090743 A1 | 4/2005 | Kawashima et al. | |
| 2005/0150300 A1 | 7/2005 | Nenno et al. | |
| 2005/0166413 A1 | 8/2005 | Crampton | |
| 2005/0256402 A1 | 11/2005 | Kawashima et al. | |
| 2006/0213250 A1 | 9/2006 | Vaccaro et al. | |
| 2006/0288756 A1 | 12/2006 | De Meurechy | |
| 2007/0033991 A1 | 2/2007 | Rice et al. | |
| 2007/0101815 A1 | 5/2007 | Kollgaard et al. | |
| 2008/0127733 A1 | 6/2008 | Kurkcu et al. | |
| 2008/0249405 A1 | 10/2008 | Kakee | |
| 2009/0062648 A1 | 3/2009 | Derby, Jr. | |
| 2009/0069682 A1 | 3/2009 | Hastings et al. | |
| 2009/0235749 A1 | 9/2009 | Ehara et al. | |
| 2009/0277269 A1 | 11/2009 | Sarr | |
| 2010/0018069 A1 | 1/2010 | Ould et al. | |
| 2010/0149525 A1 | 6/2010 | Lau | |
| 2010/0224000 A1 | 9/2010 | Komatsu et al. | |
| 2011/0000299 A1 | 1/2011 | Isobe et al. | |
| 2011/0107270 A1 | 5/2011 | Wang et al. | |
| 2011/0141270 A1 | 6/2011 | Miyake | |
| 2011/0270537 A1 | 11/2011 | Wong et al. | |
| 2011/0270562 A1 | 11/2011 | Ito et al. | |
| 2012/0024067 A1 | 2/2012 | Oberdoerfer et al. | |
| 2012/0053462 A1 | 3/2012 | Kim | |
| 2012/0101764 A1 | 4/2012 | Mckeon | |
| 2012/0234073 A1 | 9/2012 | Knorr | |
| 2012/0328176 A1 | 12/2012 | Ren et al. | |
| 2013/0319071 A1 | 12/2013 | Vodnick et al. | |
| 2013/0340531 A1 | 12/2013 | Hutchinson et al. | |
| 2014/0024941 A1 | 1/2014 | Umeda et al. | |
| 2014/0238136 A1 | 8/2014 | Ten et al. | |
| 2014/0268108 A1 | 9/2014 | Grau | |
| 2014/0305217 A1 | 10/2014 | Tapia et al. | |
| 2015/0000410 A1 * | 1/2015 | Grimard ............. | G01N 29/265 73/634 |
| 2015/0035523 A1 | 2/2015 | Lombardo et al. | |
| 2015/0316513 A1 | 11/2015 | Grimard et al. | |
| 2016/0109283 A1 | 4/2016 | Broussais-Colella et al. | |
| 2021/0341435 A1 * | 11/2021 | Sicard .................. | G01N 29/069 |

FOREIGN PATENT DOCUMENTS

| | | |
|---|---|---|
| CA | 3105805 A1 | 10/2021 |
| EP | 1676128 B1 | 2/2008 |
| EP | 1815936 B1 | 11/2009 |
| EP | 2325625 A1 | 5/2011 |
| EP | 2007285 B1 | 2/2014 |
| WO | 2014191661 A1 | 12/2014 |

OTHER PUBLICATIONS

TecScan, Scan3D: Ultrasonic Immersion Tank, https://www.youtube.com/watch?v=SV9ZO2GC-UO, Published on Apr. 12, 2012, 13 pages.

TecScan, NDT Immersion Tank for Composite Fan Blades https://www.youtube.com/watch?V=xyVlod7LuH8, Published on Feb. 26, 2013, 10 pages.

* cited by examiner

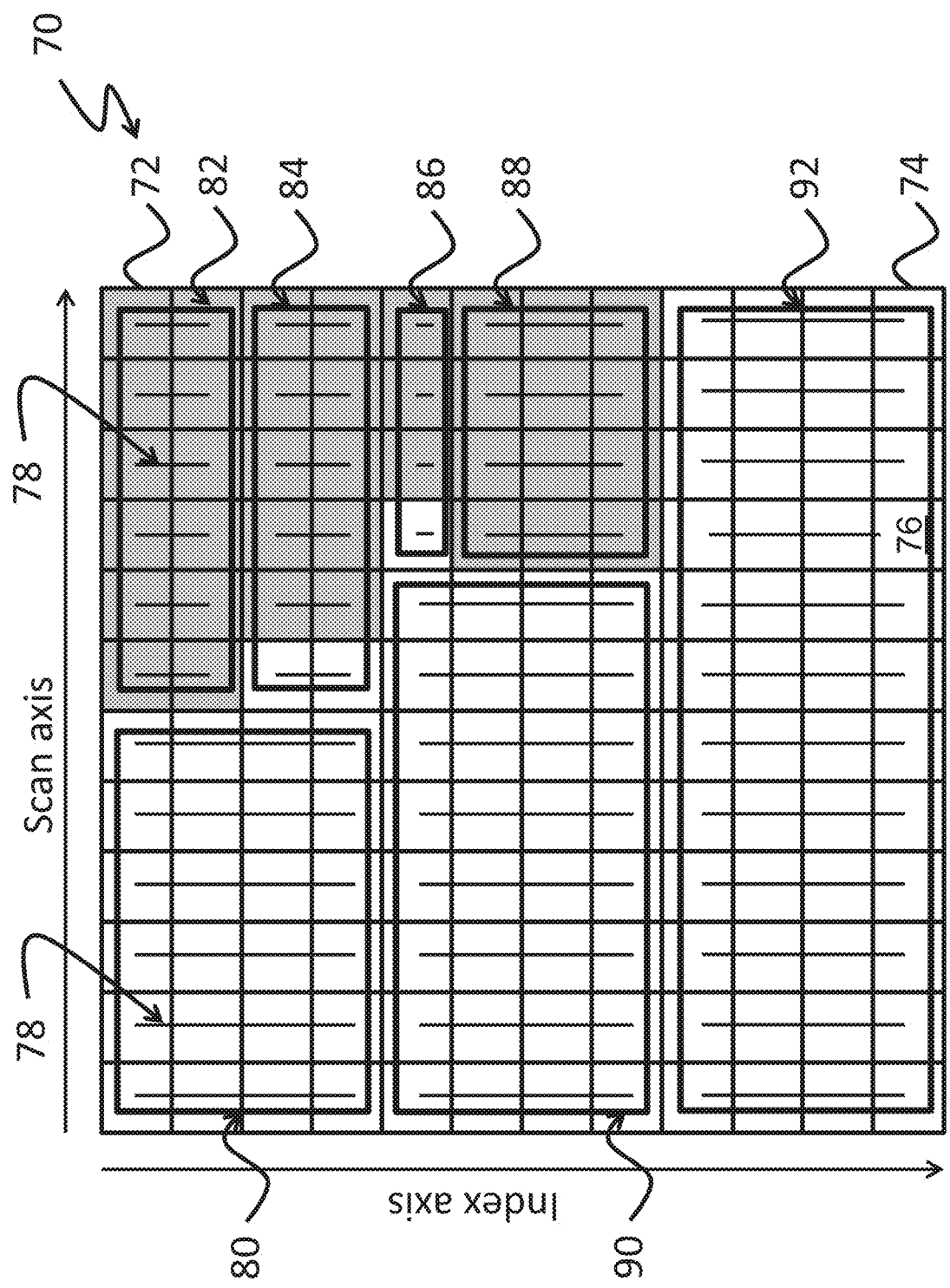

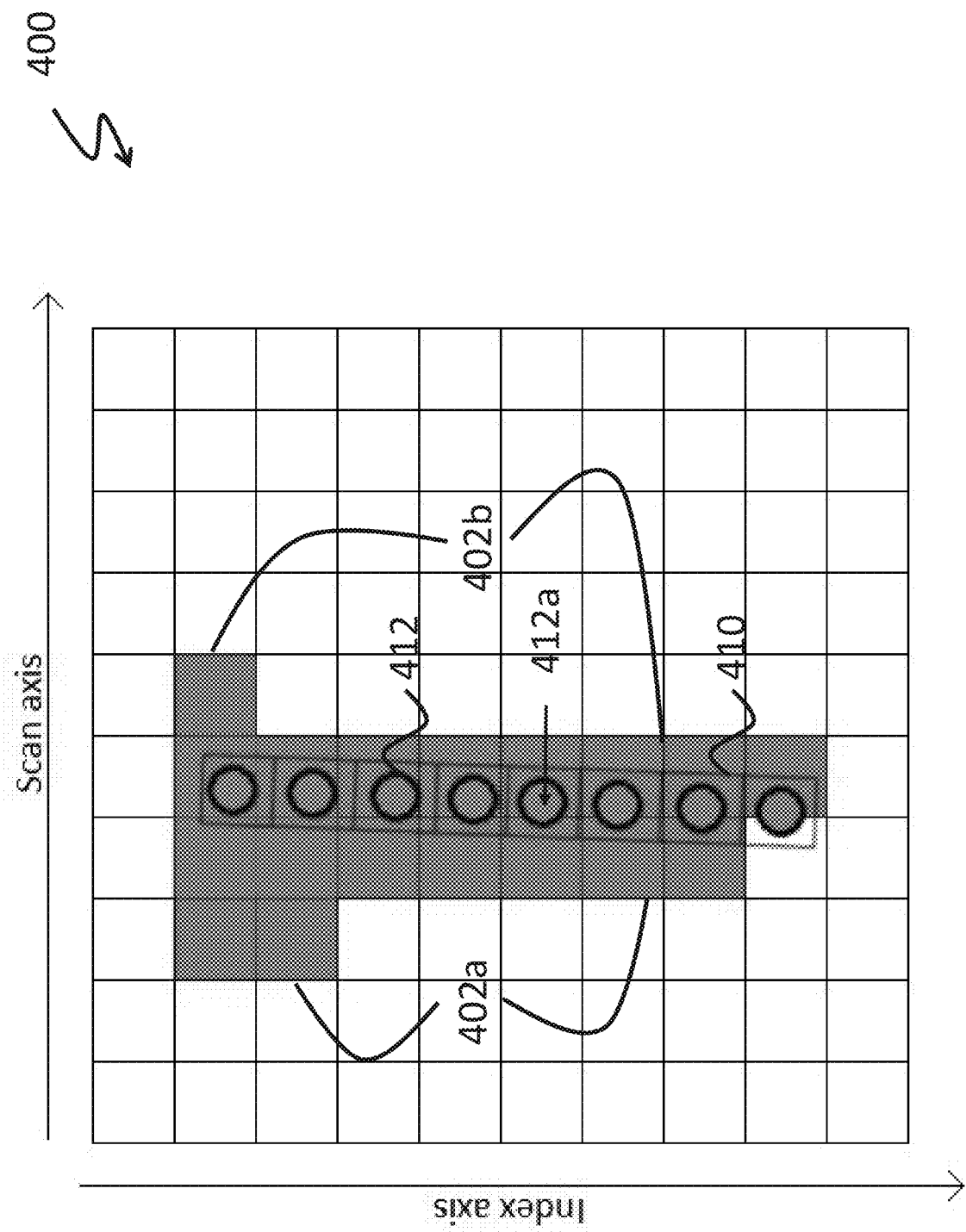

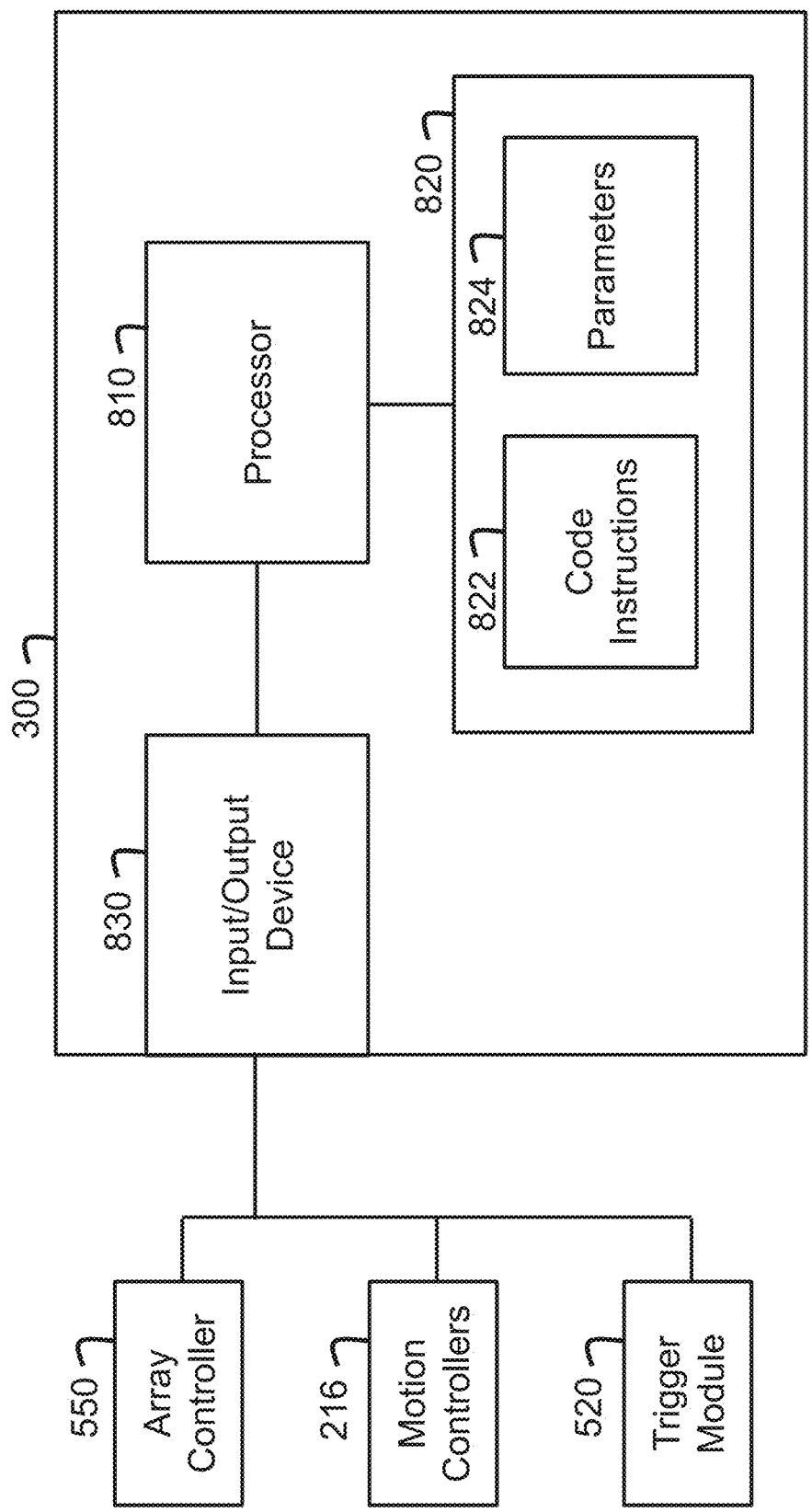

SYSTEM AND METHOD FOR SCANNING AN OBJECT USING AN ARRAY OF ULTRASONIC TRANSDUCERS

CROSS-REFERENCE

The present application claims priority from U.S. Provisional Patent Application Ser. No. 63/156,692, filed on Mar. 4, 2021, the disclosure of which is incorporated by reference herein in its entirety.

TECHNICAL FIELD

The present disclosure relates to the field of non-destructive testing. More specifically, the present disclosure relates a system and a method for scanning an object using an array of ultrasonic transducers.

BACKGROUND

In non-destructive ultrasonic testing, ultrasound waves are emitted into a test object by a transducer. In pulse-echo mode, a portion of the ultrasound wave energy is reflected back to the same transducer when the wave front encounters a change in acoustic impedance within the test object. In through-transmission mode, a portion of the ultrasound wave energy reaches another transducer, with an energy level that may vary as the ultrasound wave passes through a change in acoustic impedance of the test object. In both cases, this change in the acoustic impedance may be caused by a change in material properties of the test object, or by the presence of a defect within the test object. Whether caused by a defect or by a change of material properties, collecting the reflected wave energy provides information about the internal structure of the test object.

In either mode, the detected wave energy is converted into an electrical signal that is monitored to detect the presence of defects in the test object. Automated ultrasound scanners use robotic manipulators to move the transducers along the test object while recording the electrical signals at specific locations. A data grid resulting from this data collection may then be analysed to determine presence of defects in the test object and, if present, the size and location of each detected defect. Examples of such scanners may be found, for example, in U.S. Pat. No. 9,651,525, issued on May 16, 2017 to Grimard et al. and in U.S. Pat. No. 10,338,036, issued on Jul. 2, 2019 to Grimard et al., the disclosure of both of which is incorporated by reference herein.

It is necessary to define a large number of scanning points to obtain a precise evaluation of the test object. Consequently, a considerable amount of time may be required to scan a large or a complex test object. A plurality of sensing elements arranged in an array may be used to reduce the scanning time. However, arrays of sensing elements are not well-suited for scanning test objects having complex shapes.

Therefore, there is a need for techniques that allow to rapidly scan, with precision, objects having complex shapes.

SUMMARY

According to a first aspect of the present disclosure, there is provided a method for preparing a scan plan for scanning an object using an array of ultrasonic transducers, comprising:

a) defining a plurality of grid positions on the surface of the object;
b) selecting a grid position;
c) identifying, for the selected grid position, (i) one or more enabled transducers of the array and (ii) a corresponding group of one or more grid positions, the identifying comprising, for each given transducer of the array:
   evaluating a direction of incidence of a planned ultrasonic signal emitted by the given transducer on a respective grid position on the surface of the object when the array is planned to be positioned according to the selected grid position,
   evaluating a difference between the direction of incidence and a surface normal vector defined on the surface of the object at the respective grid position, and
   in response to the difference being less than a threshold, marking the given transducer as enabled at the selected grid position and including the respective grid position in the group of grid positions corresponding to the selected grid position;
d) repeating b) and c) by selecting a new grid position at each repetition of b) until all of the grid positions defined on the surface of the object are included in at least one of the groups of grid positions; and
e) defining the scan plan to include all of the selected grid positions.

According to a second aspect of the present disclosure, there is provided a method for scanning an object using an array of ultrasonic transducers, comprising:
defining a scan plan using the above described method; and
moving the array according to the scan plan while collecting, by the transducers that are enabled at each selected grid position, eventual responses to the ultrasonic signals from their respective grid positions.

According to a third aspect of the present disclosure, there is provided a method for scanning an object using an array of ultrasonic transducers, comprising:
defining a scan plan using the above described method; and
moving the array according to the scan plan;
wherein:
   each transducer of the array comprises a pair including an emitting transducer and a receiving transducer,
   the ultrasonic signals are emitted by enabled emitting transducers toward a first surface of the object,
   the ultrasonic signals are detected in through-transmission mode by receiving transducers corresponding to the enabled emitting transducers, and
   the ultrasonic signals are received at the receiving transducers from a second surface of the object opposite from the first surface of the object.

According to a fourth aspect of the present disclosure, there is provided a system for scanning an object using an array of ultrasonic transducers, comprising:
an array of ultrasonic transducers adapted to emit ultrasonic signals on a surface of the object and to detect responses to the ultrasonic signals;
a robotic manipulator supporting the array of ultrasonic transducers;
a motion controller adapted to control the robotic manipulator for positioning the array of ultrasonic transducers;
a controller operatively connected to the array of ultrasonic transducers and to the motion controller, the controller comprising a processor; and
a non-transitory computer-readable medium storing code instructions that are executable by the processor to control operation of the method for preparing the scan plan and of the method for scanning the object.

According to a fifth aspect of the present disclosure, there is provided a system for scanning an object using an array of ultrasonic transducers, comprising:
an array of emitting ultrasonic transducers adapted to emit ultrasonic signals toward a first surface of the object;
an array of receiving transducers adapted to detect the ultrasonic signals, the ultrasonic signals being detected in through-transmission mode and being received at the receiving transducers from a second surface of the object opposite from the first surface of the object;
a first robotic manipulator supporting the array of emitting ultrasonic transducers;
a second robotic manipulator supporting the array of receiving ultrasonic transducers;
a motion controller adapted to control the first and second robotic manipulator for positioning of the arrays of emitting and receiving ultrasonic transducers;
a controller operatively connected to the arrays of emitting and receiving ultrasonic transducers and to the motion controller, the controller comprising a processor; and
a non-transitory computer-readable medium storing code instructions that are executable by the processor to control operation of the method for preparing the scan plan and of the method for scanning the object.

The foregoing and other features will become more apparent upon reading of the following non-restrictive description of illustrative embodiments thereof, given by way of example only with reference to the accompanying drawings.

BRIEF DESCRIPTION OF THE DRAWINGS

Embodiments of the disclosure will be described by way of example only with reference to the accompanying drawings, in which:

FIG. 8 illustrates another scanning path of an array having four transducers with a varying number of enabled ultrasonic transducers, in accordance with an embodiment of the present technology;

FIGS. 9A to 9E illustrate a further technique for scanning a surface using varying number of enabled ultrasonic transducers, in accordance with an embodiment of the present technology;

FIG. 15 is a block diagram of a controller of the system for scanning an object using multiple channels, in accordance with an embodiment of the present technology.

Like numerals represent like features on the various drawings.

DETAILED DESCRIPTION

Various aspects of the present disclosure generally address one or more of the problems related to the rapid scanning, with precision, of objects having complex shapes.

Figure 1:
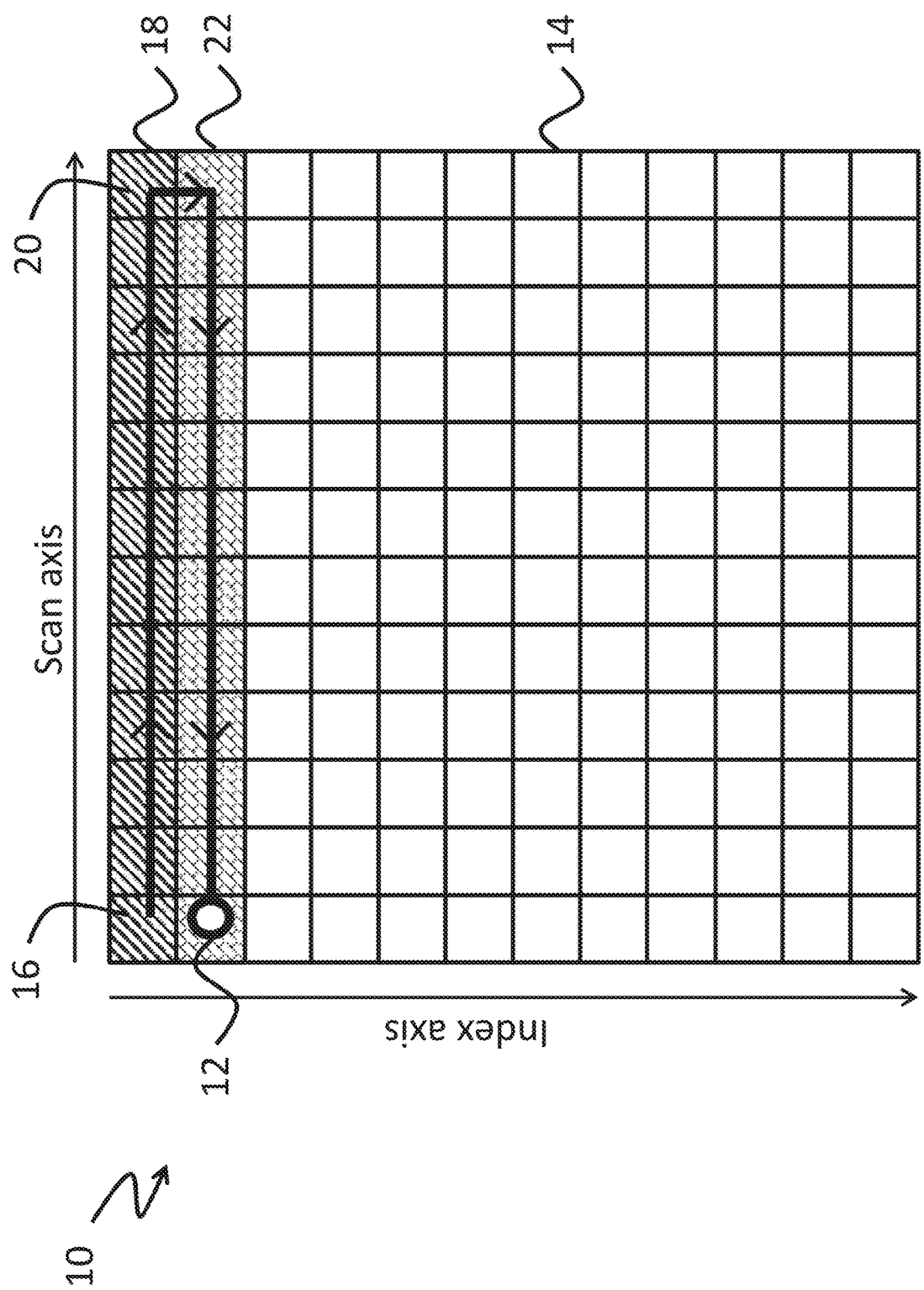
FIG. 1 is an illustration of a scanning path of a single ultrasonic transducer over a grid pattern defined on a surface of a test object, in accordance with an embodiment of the present technology.

FIG. 1 is an illustration of a scanning path of a single ultrasonic transducer over a grid pattern defined on a surface of a test object, in accordance with an embodiment of the present technology. A regularly shaped object 10, for example a flat panel, is scanned using a single ultrasonic transducer 12 in pulse-echo mode. Typically, a controller maps the surface of the object 10 in a regular grid 14 aligned with two scanning axes, including a scan axis and an index axis. The controller positions origins of the scan and index axes at a first grid position 16. The transducer 12 is then moved from the first grid position 16, along the scan axis, in a first row 18 of the grid 14, until it reaches a grid position 20 at an opposite end of the scan surface. The position of the transducer 12 along the scan axis is monitored during this first scan pass and trigger signals are sent to the transducer 12 when it reaches each successive position corresponding to grid positions of the grid 14. In response to each trigger signal, the transducer 12 emits an ultrasonic signal and may receive an echo indicative of defect present in the test object.

Figure 1A:
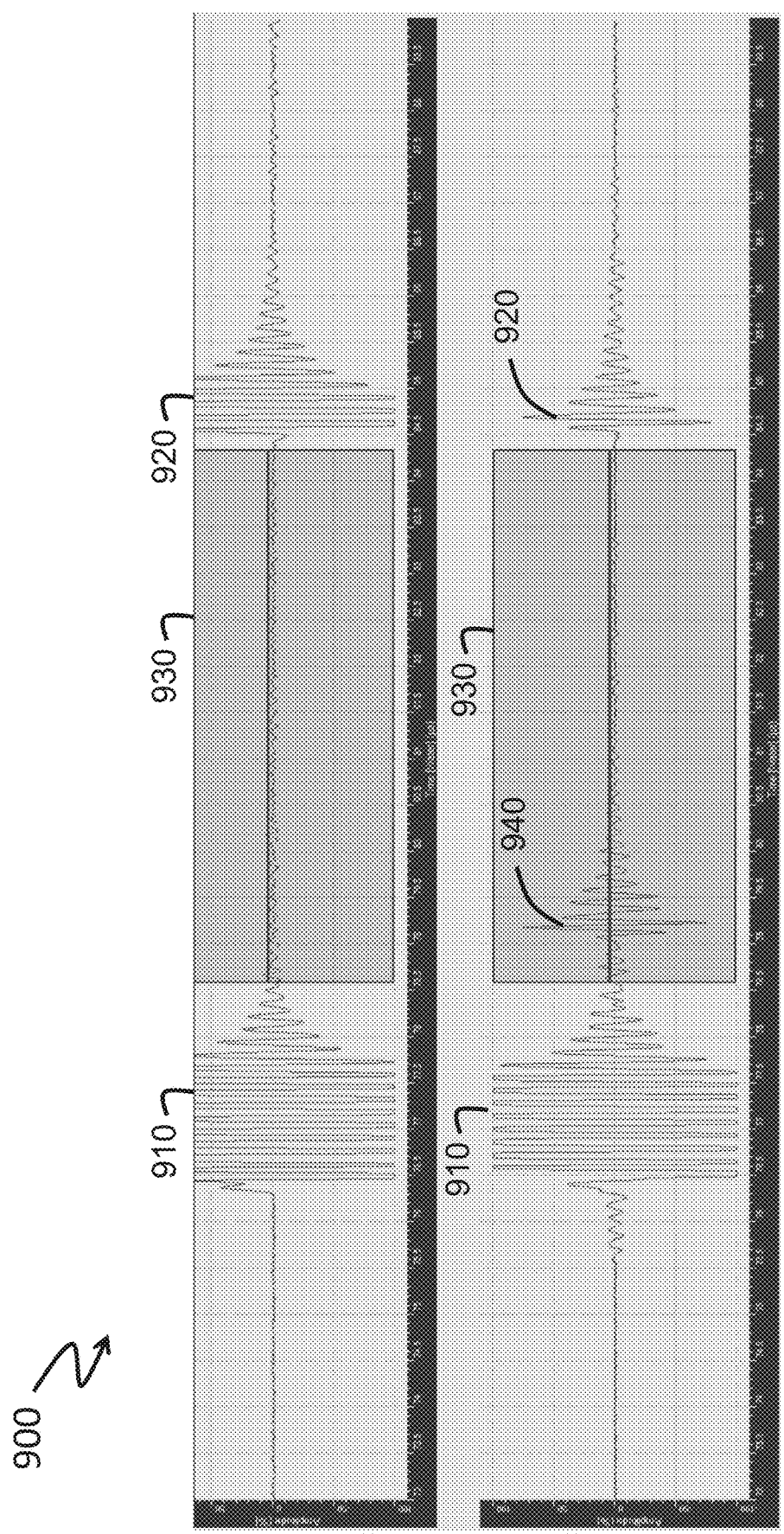
FIG. 1a illustrates timing sequences of echoes received at the transducer, in accordance with an embodiment of the present technology.

In more details, FIG. 1a illustrates timing sequences 900 of echoes received at the transducer 12, in accordance with an embodiment of the present technology. Generally speaking, when operating in pulse-echo mode, the ultrasonic signal reaches the surface of the test object and causes a surface echo 910 to be received at the transducer 12, for example after a delay of 76 microseconds, which depends on a distance between the transducer 12 and the surface of the test object and on a speed of sound in the medium, for example water, between the transducer 12 and the test object. This surface echo 910 does not provide information about a potential defect within the test object. The ultrasonic signal may reach a back surface of the test object and cause a back-surface echo 920 to be received at the transducer, for example after a delay of about 84 microseconds. This back-surface echo 920 also does not provide information about a potential defect within the test object. A test window 930 may be defined between the end of the surface echo and the start of the back-surface echo. An echo 940, if received within the timeframe defined by the test window 930, may reveal a defect imbedded within the test object, between the opposite surfaces of the test object. The echo 940 is the eventual response that is searched for when scanning the test object in pulse-echo mode. In the remainder of the present disclosure, when discussing scanning in pulse-echo modes, mentions of eventual responses will relate to such echoes 940 and not to surface echoes 910 or to back-surface echoes 920. It should be understood that the present disclosure refers to "eventual responses" that may or may not be received following the emission of an ultrasonic signal, as such responses are received when the ultrasonic signals is reflected by a defect of the test object.

Continuing with the description of FIG. 1, the transducer 12 converts an eventual response received at a given grid position into an electrical waveform, which is converted into a digitized response. Each trigger and the resulting digitized response are associated with a corresponding position on the grid 14. At the end of a first scan pass in which an ultrasonic signal has been emitted by the transducer 12 at the grid position 20, the transducer 12 is moved to the beginning of a row 22 of the grid 14, where a second scan pass is initiated. The process is repeated until all rows of the grid 14 have been scanned.

While the example of FIG. 1 illustrates the use of a single transducer 12 in pulse-echo mode, the object 10 could also be scanned using a single transducer pair in through-transmission mode. An ultrasonic signal emitted by an emitting transducer of the transducer pair is received at a corresponding receiving transducer of the transducer pair. The single transducer pair may be displaced in similar fashion so that triggers and ultrasonic signals received at the receiving transducer may be collected for each corresponding position on the grid 14, in an equivalent fashion. Considerations of surface echoes and back-surface echoes are not relevant when scanning in through-transmission mode.

Figure 2:
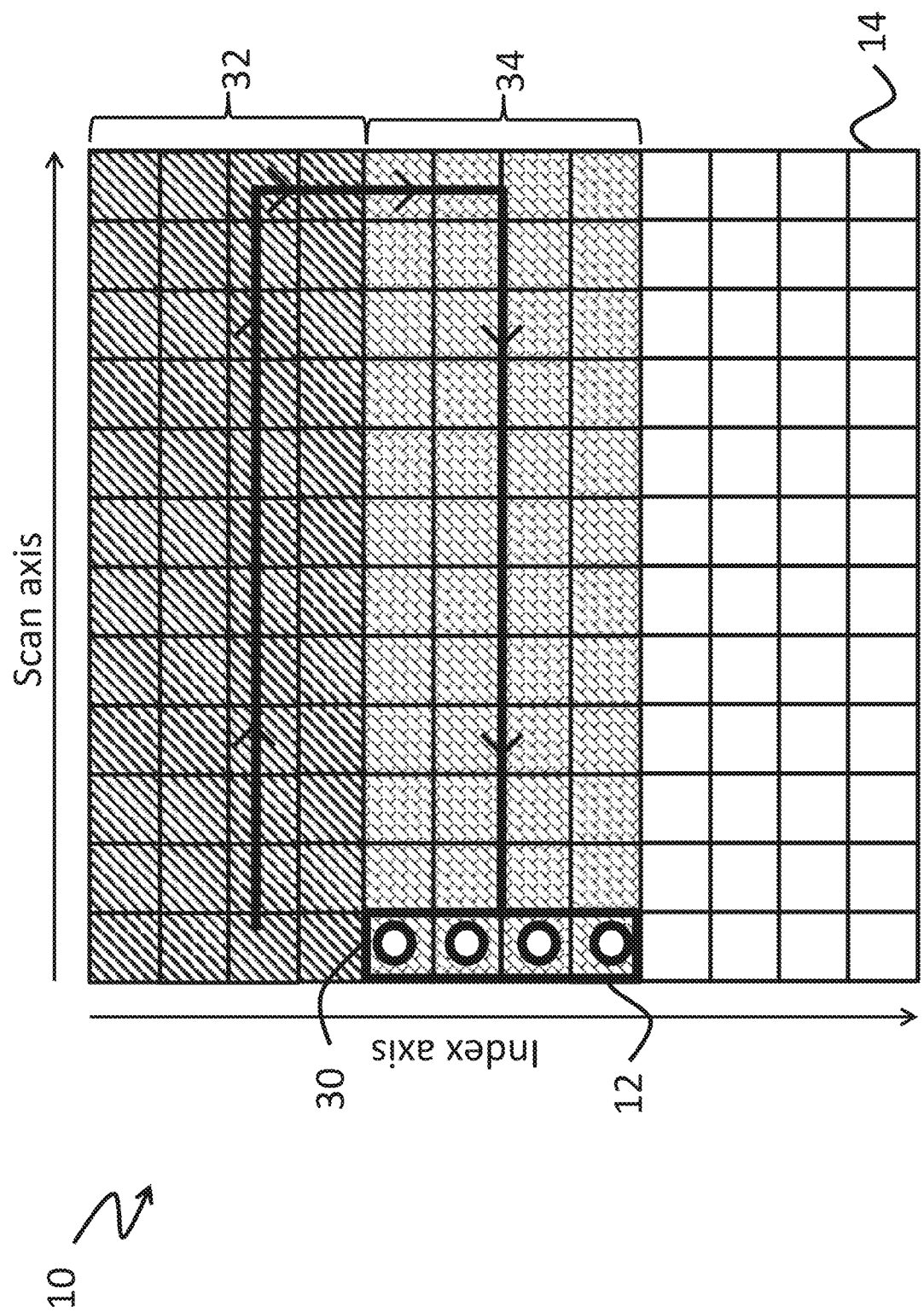
FIG. 2 is an illustration of a scanning path of an array of ultrasonic transducers over a grid pattern defined on a surface of a test object, in accordance with an embodiment of the present technology.

FIG. 2 is an illustration of a scanning path of an array of ultrasonic transducers over a grid pattern defined on a surface of a test object, in accordance with an embodiment of the present technology. The object 10, the regular grid 14 and the scan and index axes of FIG. 1 are reproduced on FIG. 2.

In order to decrease the time required to scan the object 10, some systems use transducer groups that may either comprise multiple single element transducers, for example multi-channel pulser-receivers, or phased array transducers. For example, for scanning flat objects such as the object 10, an array 30 of ultrasonic transducers 12 is arranged in a linear pattern parallel to the index axis. As the array 30 of transducers 12 is moved between grid positions along the scan axis, it receives triggers that are translated into transducer sequences for individually causing the transducers 12 of the array 30 to emit respective ultrasonic signal and to receive corresponding eventual responses from grid positions on a first scan pass 32. When all grid positions of the first scan pass 32 have been covered, the array 30 of transducers 12 is moved in the direction of the index axis and a second scan pass 34 is initiated over more rows on the grid 14. Scanning of the object 10 is considerably faster using the array 30 of transducers 12, when compared to the use of a single transducer 12 as shown on FIG. 1. Although FIG. 2 illustrates a non-limiting example in which a spacing of neighboring transducers 12 corresponds to a width of the rows of the grid 14, the transducers 12 may have different spacings.

Once again, while the example of FIG. 2 illustrates the use of an array 30 of transducers 12 in pulse-echo mode, the object 10 could also be scanned using a pair of emitting and receiving transducer arrays in through-transmission mode. The pair of arrays may be displaced in similar fashion and triggers and responses may also be collected for each corresponding position on the grid 14, in an equivalent fashion.

The technique illustrated in FIG. 2 is easily adaptable to scanning of flat or mainly flat objects. In those cases, the transducers 12 of the array 30 emit ultrasonic signals that are substantially perpendicular to a surface of the object being scanned, regardless of the scan and index axe positions on the grid 14. Objects that are not entirely flat but have radiuses of curvature that are much greater than a width of the array 30 may also be scanned using this technique, inasmuch as eventual responses resulting from ultrasonic signals emitted by all transducers 12 are effectively detected by the same transducers 12, being only slightly deflected by modest curvatures on the surface of the object.

However, this technique is not adapted for accelerated scanning of complex shapes. When scanning complex shapes, it is no longer possible to orient and position each transducer 12 of the array 30 such that each ultrasonic signal will reach the surface of the object at a proper angle.

Figure 3:
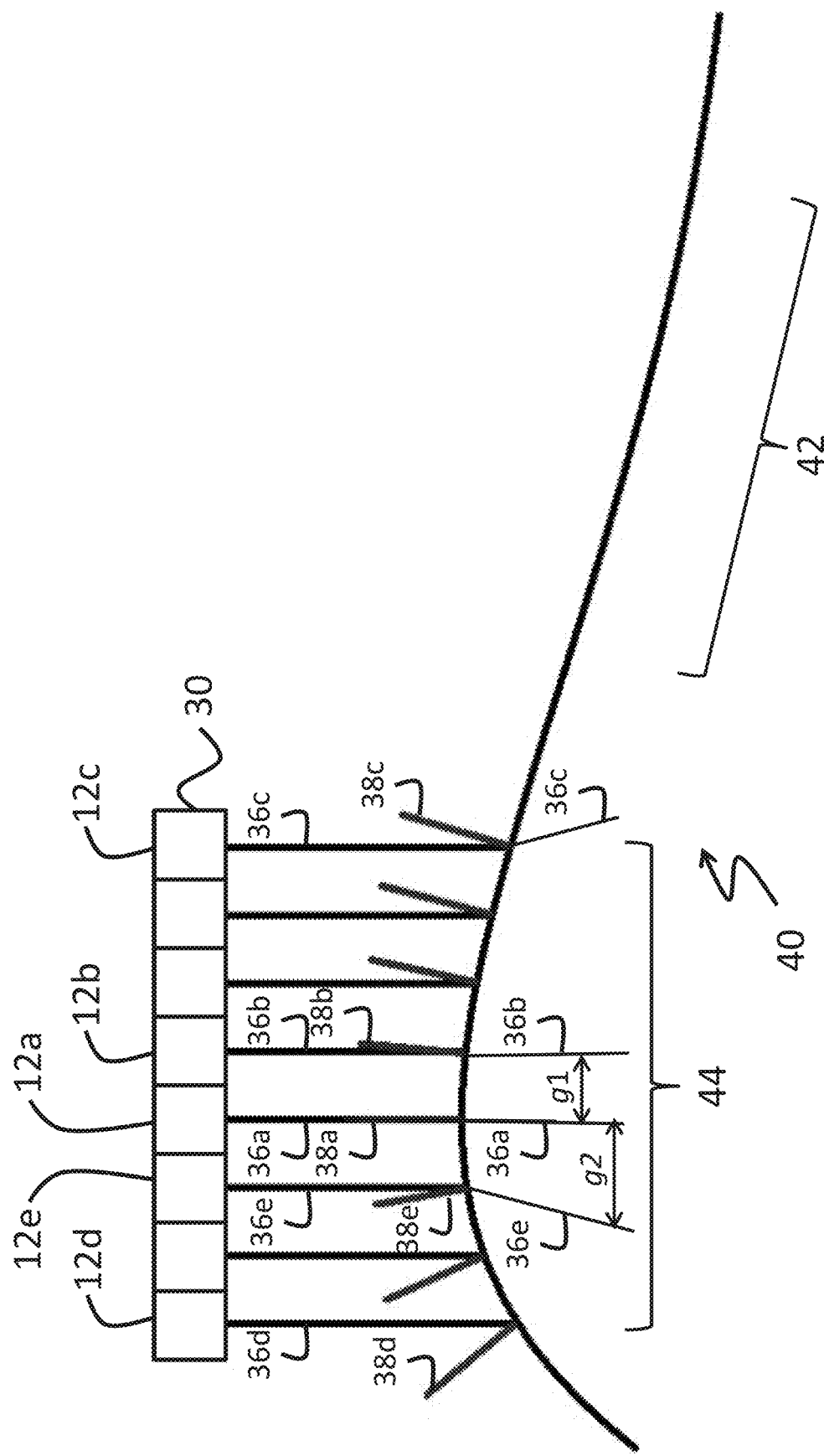
FIG. 3 is an illustration of ultrasonic signals emitted from an array of ultrasonic transducers and of surface normal vectors at entry points of the ultrasonic signals on a curved surface of a test object, in accordance with an embodiment of the present technology.

FIG. 3 is an illustration of ultrasonic signals emitted from an array of ultrasonic transducers and of surface normal vectors at entry points of the ultrasonic signals on a curved surface of a test object, in accordance with an embodiment of the present technology. FIG. 3 illustrates a pulse-echo mode example in order to simplify the illustration. A part of a surface 40 of a test object is shown. One portion 42 of the surface 40 is fairly flat while another portion 44 of the surface 40 has a small curvature radius. In this example, the array 30 comprises 8 transducers and is located above the curved portion 44 of the surface 40. Each transducer 12 may emit an ultrasonic signal 36 along a propagation direction corresponding to the lines indicated for example by use of the references 36a, 36b, 36c, 36d and 36e on FIG. 3. The ultrasonic signals 36a, 36b, 36c, 36d and 36e emitted by transducers 12a, 12b, 12c, 12d and 12e would impinge on entry points on the surface 40 of the test object at respective directions of incidence. Corresponding surface normal vectors at the entry points of the ultrasonic signals are designated with references 38a, 38b, 38c, 38d and 38e on FIG. 3.

Each ultrasonic signal 36a-36e may reach the surface 40 of the test object at a direction of incidence that may or may not be parallel with the surface normal vector 38a-38e at the respective entry point. For example, the direction of incidence of the ultrasonic signal 36a emitted by the transducer 12a is substantially parallel with the surface normal vector 38a, so the ultrasonic signal 36a is not substantially deflected as it penetrates under the surface 40 of the test object. It may be observed that the speed of sound within the material of the test object may be greater than the speed of sound in the medium (e.g. water) between the array 30 and the surface 40. As such, a modest angular difference between the direction of incidence and the surface normal vector may translate into an important angular deviation of the ultrasonic signal 36a within the material of the test object. As illustrated, because the direction of incidence of the ultrasonic signal 36a is substantially parallel with the surface normal vector 38a, an eventual response that may be generated if the ultrasonic signal 36a reaches a defect underneath the surface 40 of the test object is substantially parallel with the ultrasonic signal 36a and properly detected by the transducer 12a. The transducer 12a may then be marked enabled for scanning the surface 40 when the array 30 is in the position illustrated on FIG. 3. The eventual response is not shown separately, as it is substantially colinear with the ultrasonic signal 36a.

The ultrasonic signal 36b emitted by the transducer 12b has an angle incidence against the surface 40 that has a small angular difference from the surface normal vector 38b, so the ultrasonic signal 36b is slightly deflected as it penetrates under the surface 40 of the test object. Underneath the surface 40, the ultrasonic signal 36b is not exactly parallel with the ultrasonic signal 36a. Still, given the modest deflection of the ultrasonic signal 36b, the ultrasonic signals 36a and 36b are still sufficiently close that a small gap g1 therebetween is consistent with a spacing of the grid positions on the surface 40. An eventual response that may be generated if the ultrasonic signal 36b reaches a defect underneath the surface 40 of the test object is substantially parallel with the ultrasonic signal 36b and properly detected by the transducer 12b. The transducer 12b may then be marked enabled for scanning the surface 40 when the array is in the position illustrated on FIG. 3. In contrast, the ultrasonic signal 36e emitted by the transducer 12e has a direction of incidence against the surface 40 that has larger angular difference from the surface normal vector 38e, so the ultrasonic signal 36e is substantially deflected as it penetrates under the surface 40 of the test object. Underneath the surface 40, the ultrasonic signal 36e is far from being parallel with the ultrasonic signal 36a. A large gap g2 is present between the ultrasonic signals 36a and 36e underneath the surface 40. A potential defect located in the object between the ultrasonic signals 36a and 36e might be undetected. If the gap g2 is larger than a desired threshold at that location, the transducer 12e is marked as disabled and will not be used for scanning the surface 40 when the array 30, and particularly the transducer 12a, are positioned as shown on FIG. 3.

The spacing of grid positions on a given area of the surface 40 of the object may have been determined in part based on the need to detect defects of a given size. Alternatively or in addition, some types of defects might be improperly detected if reached at a large direction of incidence by the ultrasonic signals. Summarily speaking, a given transducer may be marked as enabled or disabled, for a given position of the array 30, based on one or more of a direction of incidence of an ultrasonic signal reaching the surface 40 of the object, a direction of incidence of responses returning from the surface 40 (in pulse-echo mode), a direction of incidence of ultrasonic signals transmitted through the object (in through-transmission mode), the direction of incidence of ultrasonic signals reaching a defect within the object, the direction of incidence of ultrasonic signals or responses reaching a transducer, and a distance between a given transducer and the surface of the object.

Hence, in the context of the illustration of FIG. 3, when the array 30 is positioned in view of the portion 44 of the surface 40, the transducers 12a and 12b are considered able to provide useful information related to possible defects found underneath their entry points on the surface 40 and are thus marked as enabled for the particular position of the array 30. All other transducers of the array 30 are marked as disabled for the same position of the array 30.

It may be noted that FIG. 3 illustrates a non-limiting example in which all transducers 12 of the array 30 are colinear and in which all ultrasonic signals 36 are parallel. In another example, the transducers 12 may form an arc on the array 30 and emit non-parallel ultrasonic signals 36. It that example, provided that the arc formed by the array 30 matches the curved portion 44 of the surface 40, more of the transducers 12 might be able to collect eventual responses from the curved portion 44 of the surface 40, but might fail to collect other eventual responses from the flat portion 42 of the surface 40.

Figure 4:
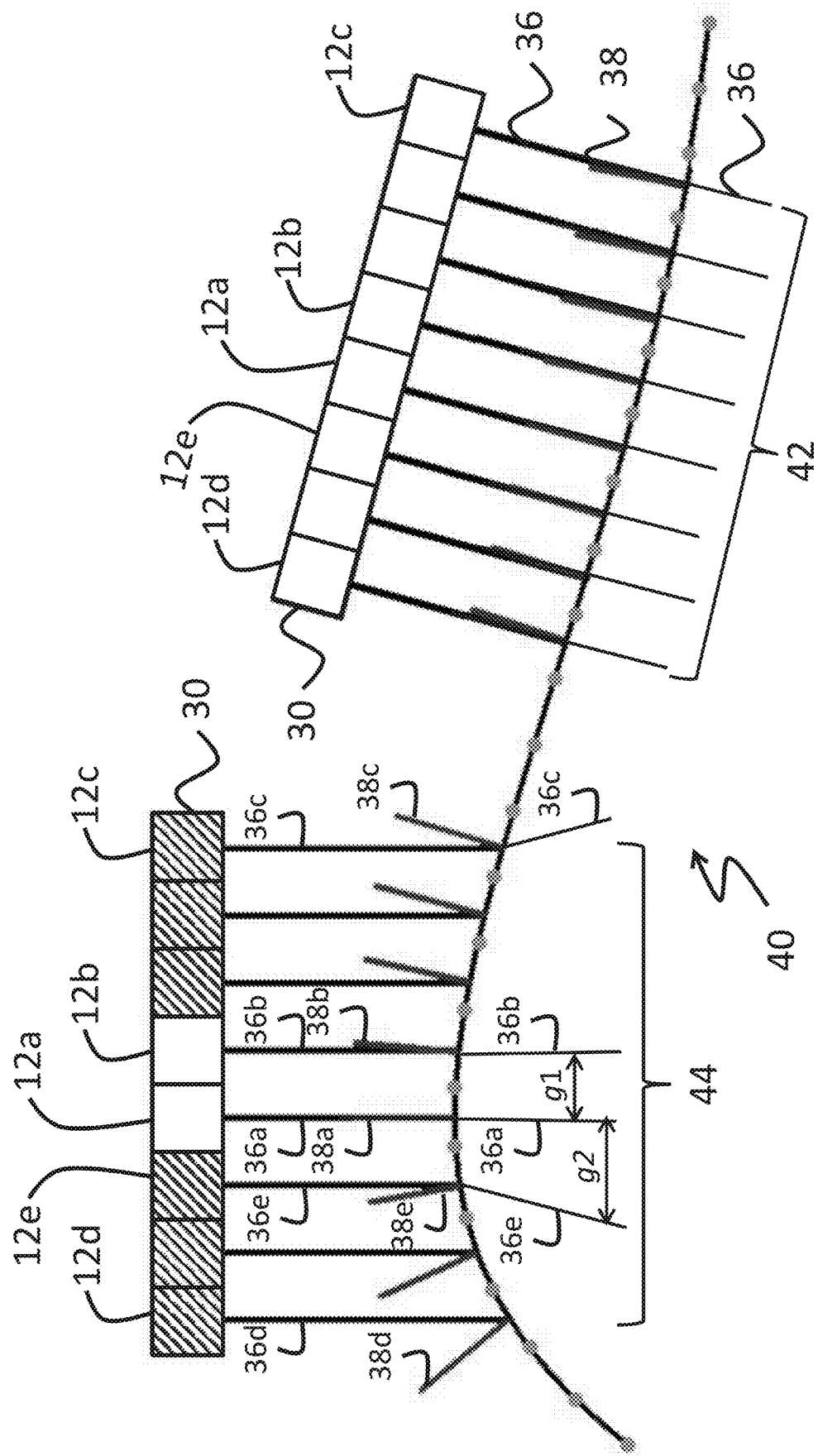
FIG. 4 illustrates how a number of enabled ultrasonic transducers of the array of FIG. 3 may vary according to a position of the array in view of the surface of the test object, in accordance with an embodiment of the present technology.

FIG. 4 illustrates how a number of enabled ultrasonic transducers of the array of FIG. 3 may vary according to a position of the array in view of the surface of the test object, in accordance with an embodiment of the present technology. The left-hand side of FIG. 4 highlights that when the array 30 is positioned in view of the curved portion 44 of the surface 40 of the object, only the transducers 12a and 12b (in this example) may emit ultrasonic signals 36a and 36b that will reach the surface 40 of the test object at acceptable directions of incidence. FIG. 4 also shows, on its right-hand side, that when the array 30 is moved in view of the flat portion 42 of the surface 40 of the object, ultrasonic signals 36 emitted by each of the transducers 12 of the array 30 are substantially parallel with surface normal vectors 38. Eventual responses may then be properly received at the respective transducers 12, either directly or deflected at slight angles.

As the array 30 is moved in relation to the surface 40 of the object, from its position in view of the curved portion 44 to its position in view of the flat portion 42, the number of transducers 12 that may be enabled or disabled may change. The number of enabled transducers is determined based on the a priori knowledge of the configuration of the surface 40 of the object. Once again, should the transducers 12 of the array 30 be disposed along an arc, instead of being linearly distributed, some of the transducers 12 might not be able to correctly receive and detect eventual responses when positioning the array 30 in view of the flat portion 42 of the surface 40.

Figure 5:
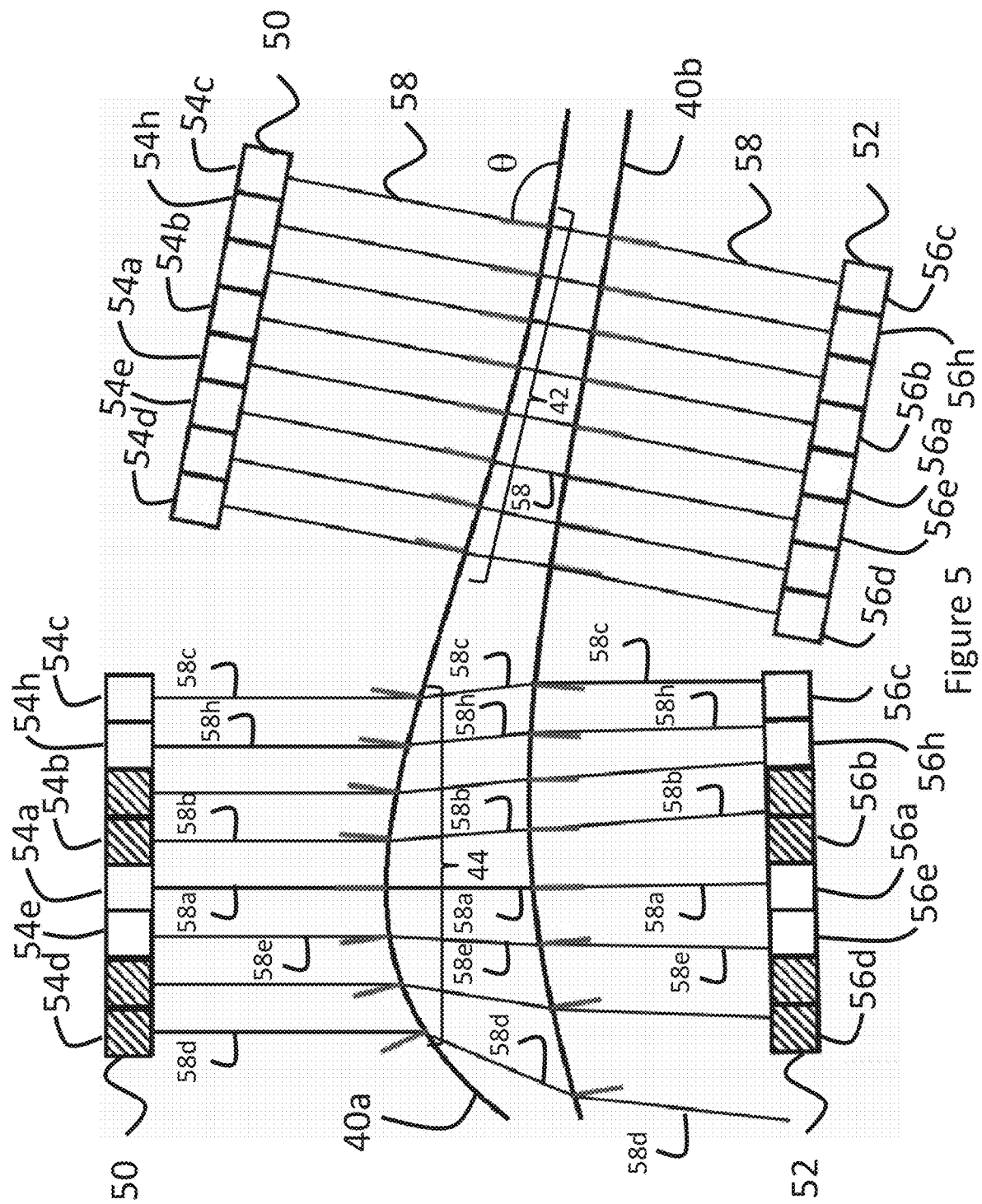
FIG. 5 illustrates how a number of enabled of ultrasonic transducers of an array used in transmission mode varies according to a position of the array in view of the surface of the test object, in accordance with an embodiment of the present technology.

FIG. 5 illustrates how a number of enabled of ultrasonic transducers of an array used in transmission mode varies according to a position of the array in view of the surface of the test object, in accordance with an embodiment of the present technology. The object shown on FIG. 5 has a top surface 40a, similar to the surface 40 of FIGS. 3 and 4, and further has a bottom surface 40b. An array 50 comprises emitting transducers, some of which are identified with references 54a, 54b, 54c, 54d and 54e, the emitting transducers being positioned in view of the top surface 40a. The array 50 is mated with an array 52 so that the pair of arrays 50 and 52 move about the object to be scanned while maintaining, in the non-limiting example of FIG. 5, a constant distance and orientation therebetween. As will be mentioned hereinbelow, modifying the positional relationship of the arrays 50 and 52 is also contemplated. The array 52 comprises receiving transducers, some of which are identified with references 56a, 56b, 56c, 56d and 56e, being positioned in view of the bottom surface 40b. The emitting transducers 54a-54h are able to generate ultrasonic signals, such as 58a, 58b, 58c, 58d, 58e and 58h, which impinge on the top surface 40a at various directions of incidence, and are transmitted through the object, with the intent of being detected by the receiving transducers 56a-56h.

When the array 50 is positioned in view of the curved portion 44 of the top surface 40, as shown on the left-hand side of FIG. 5, ultrasonic signals 58a and 58e emitted by the emitting transducers 54a and 54e of the array 50 impinge substantially perpendicularly on the top surface 40a of the object. The signals 58a and 58e remain substantially without deviation between the top and bottom surfaces 40a and 40b of the object. In the example of FIG. 5, the bottom surface 40b of the object is fairly flat underneath the curved portion 44 of the top surface 40a, so the ultrasonic signals 58a and 58e remain substantially without deviation when exiting the object. As such, the receiving transducers 56a and 56e of the array 52 are able to detect the ultrasonic signals 58a and 58e emitted by the corresponding emitting transducers 54a and 54e. The ultrasonic signals 58c and 58h emitted by the emitting transducers 54c and 54h are deviated due to their directions of incidence not being parallel to surface normal vectors at points where they impinge on the top surface 40a. However, the ultrasonic signals 58c and 58h are deviated again by the bottom surface 40b and successfully reach the corresponding receiving transceivers 56c and 56h. The emitting transducers 54a, 54c, 54e and 54h and the receiving transducers 56a, 56c, 56e and 56h may be marked as being enabled for purposes of scanning the object when the arrays 50 and 52 are positioned as shown on the left-hand side of FIG. 5. It may be noted that given that the ultrasonic signals 58a and 58e are substantially parallel between the top and bottom surfaces 40a and 40b, a gap between these signals may be within the desired grid spacing for the object so the ultrasonic signals 58a and 58e detected by the receiving transducers 56a and 56e may provide the desired granularity for scanning that portion of the object.

In contrast, ultrasonic signals emitted by the other emitting transducers, for example the ultrasonic signals 58b and 58d, are deflected because of the directions of incidence on the top surface 40a. The ultrasonic signals 58b and 58d fail to reach the receiving transducers 56b and 56d. Consequently, the emitting transducers 54b and 54d (and emitting transducers showing hashed lines on FIG. 5) as well as the corresponding receiving transducers are marked as enabled for purposes of scanning the object when the arrays 50 and 52 are positioned as shown on the left-hand side of FIG. 5.

When the array 50 is positioned in view of the flat portion 42 of the top surface 40a, as shown on the right-hand side of FIG. 5, the ultrasonic signals 58 emitted by all the emitting transducers 54a-54h of the array 50 impinge substantially at a same direction of incidence 6 on the top surface 40a of the object. In this context, a magnitude of the difference between the direction of incidence 6 and the surface normal vectors at the entry points of the ultrasonic signals 58 on the top surface 40a may for example be zero or be greater than zero. The ultrasonic signals 58 travel in a substantially parallel manner between the top and bottom surfaces 40a and 40b of the object. In the example of FIG. 5, the bottom surface 40b of the object is fairly flat underneath the flat portion 42 of the top surface 40a, so the ultrasonic signals 58 remain parallel when exiting the object. As such, all of the receiving transducers 56a-56h of the array 52 are able to detect the ultrasonic signals 58 emitted by the corresponding emitting transducers, as long as the magnitude of the difference between the direction of incidence 6 and the surface normal vectors at the entry points of the ultrasonic signals 58 on the top surface 40a is not excessive, and may thus be marked as being enabled for purposes of scanning the object when the arrays 50 and 52 are positioned as shown on the right hand side of FIG. 5. Use of additional criteria for marking pairs of emitting and receiving transducers as being enabled is also contemplated.

When a pair comprising one of the emitting transducers 54 and a corresponding receiving transducer 56 is marked as enabled, an ultrasonic signal 58 emitted by the emitting transducer 54 may reach a defect between the surfaces 40a and 40b of the object. As a result, the ultrasonic signal 58 may be distorted, or attenuated in whole or in part, by the defect. In some cases, the ultrasonic signal 58 may be received at a lower than expected magnitude at the receiving transducer 56. In other cases, the receiving transducer 56 may fail to detect the expected ultrasonic signal 58. Analysis of the ultrasonic signals 58 received (or not received when expected) and analysis of the magnitude of the received ultrasonic signals may lead to identification of responses related to the eventual presence of defects in the object.

It will be understood that the capability of one or more of the receiving transducers of the array 52 to detect ultrasonic signals 58 emitted by the corresponding emitting transducers of the array 50 is a function of directions of incidence of both the top surface 40a, on which the ultrasonic signals 58 impinge, and the bottom surface 40b, from which the ultrasonic signals 58 emerge. In the particular example of the left side of FIG. 5, neighboring pairs of emitting and receiving transducers (54a/56a being neighbors to 54e/56a, 54c/56c being neighbors to 54h/56h) happen to be enabled because of the particular relationships between the curvatures of the top and bottom surfaces 40a and 40b in the portion 44 as illustrated. In other examples (not shown), one or more pairs of emitting and receiving transducers may be enabled while not being neighbours on the arrays 50 and 52. The example of FIG. 5 is thus simplified for ease of illustration. Should the bottom surface 40b be curved underneath the flat portion 42 of the top surface 40a, some of the receiving transducers 56a-56h of the array 52 might not be able to detect the ultrasonic signals 58 emitted by the corresponding emitting transducers 54a-54h of the array 50. Also, FIG. 5 illustrates a particular situation in which the arrays 50 and 52 are held by a common support structure keeping them at a constant distance and at a constant relative orientation. In other examples, the arrays 50 and 52 may be mounted on distinct supports and move according to distinct degrees of freedom. Regardless, FIGS. 4 and 5 illustrate that the problems related to the curvature of the surface of an object to be scanned are similar, whether scanning is performed in pulse-echo mode or in through-transmission mode, the latter being somewhat more complex in that both arrival and exit surfaces may impact the capability to detect ultrasonic signals.

Generally speaking, the present technology overcomes the above-described difficulties by introducing an ultrasound scanning system that uses arrays of mono-element transducers, or phased array transducers, to decrease the time required to scan complex objects while maintaining ultrasound signal quality. At any given position of the array 30 of transducers 12, or at any given position of the arrays 50 and 52 of emitting and receiving transducers 54 and 56, one or more of a plurality of transducers may be used to collect information from an object being scanned, a number of transducers deemed enabled to collect ultrasonic signals from a given portion of the object being determined according to a surface representation of the object. The surface representation of the object indicates a respective surface normal vector at each grid position on the surface of the object.

Figure 6:
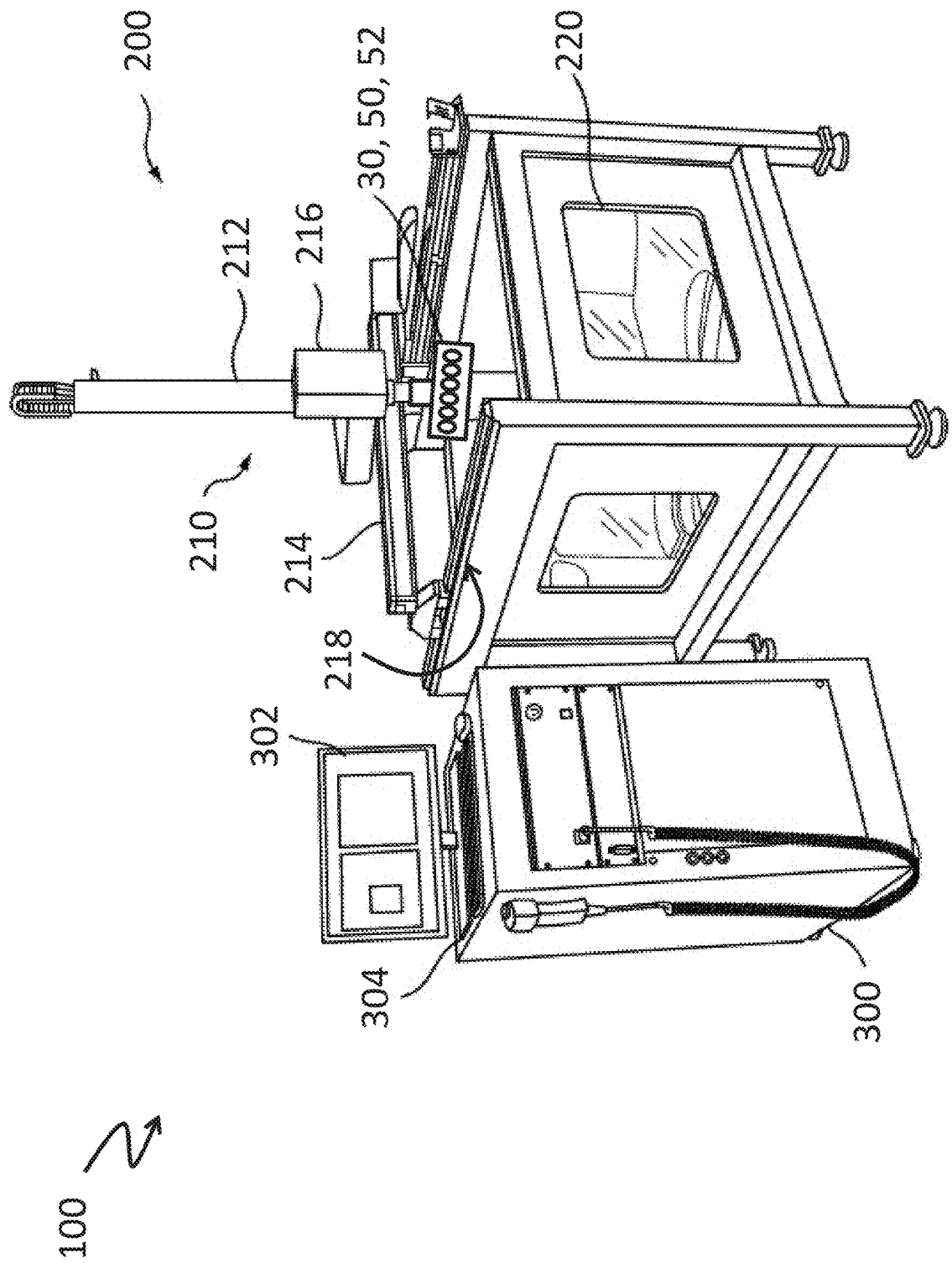
FIG. 6 is a perspective view of a system for scanning an object, in accordance with an embodiment of the present technology.

In an embodiment, mechanical components of a scanning system 100 comprise a robotic manipulator that support the array 30 of transducers 12 (or the array 50 of emitting transducers 54 and the array 52 of receiving transducers 56) for scanning the surface 40 of the object. FIG. 6 is a perspective view of a system for scanning an object, in accordance with an embodiment of the present technology. The system 100 as illustrated is one of many possible realizations of scanning systems that may include the array 30 of transducers 12, send trigger signals to the array 30 (or the arrays 50 and 52) and receive therefrom digitized responses. Some of the shown components of the system 100 are optional and may not be present in some embodiments.

The system 100 comprises a scanning apparatus 200 and a controller 300. In turn, the scanning apparatus 200 comprises a robotic manipulator 210 and a basin 220. The array 30 (FIGS. 3 and 4) or the arrays 50 and 52 (FIG. 5) is/are mounted on the robotic manipulator 210. As illustrated, the array 30 or the pair of arrays 50 and 52 is/are held within the basin 220. The basin 220 may be filled with a couplant material, for example water, air, or another fluid, the couplant material forming a controlled environment for transmission of ultrasonic signals 36 and for reception of eventual responses. The robotic manipulator 210 as shown is capable of moving the array 30 or the arrays 50 and 52 along three (3) axes by raising or lowering a vertical member 212, moving the vertical member 212 laterally along a length of an horizontal beam 214, and by moving the horizontal beam 214 longitudinally along a length 218 of the basin 220. The vertical member 212 may also pivot along its vertical axis in order to modify a yaw of the array 30 or of the arrays 50 and 52 in view of an object to be scanned. A mechanical support (not shown) that mounts the array 30 (or the arrays 50 and 52) on the vertical member 212 may also modify a vertical angle (pitch) and/or a rotational angle (roll) of the array 30 or of the arrays 50 and 52 in relation to the vertical member 212. The mechanical support, the vertical member 212 and the horizontal beam 214 allow to move the array 30 (or the arrays 50 and 52) along a total of six (6) degrees of freedom under the control of a motion controller 216, which itself receives commands from the controller 300. In an embodiment, the mechanical support may not be adapted to modify the roll angle of the array 30 (or of the arrays 50 or 52). Also in an embodiment, each of the array 50 of emitting transducers 54 and the array 52 of receiving transducers may be supported by a respective mechanical support (not shown) for mounting on a respective robotic manipulator 210.

In a non-limiting embodiment, the length 218 of the basin 220 may be consistent with the index axis and the horizontal beam 214 may extend along the scan axis. In this embodiment, scanning of an object held in the basin 220 may be performed by raising or lowering the vertical member 212 so that the array 30 or the arrays 50 and 52 is/are placed in view of the object to be scanned, optionally adjusting the pitch and/or the yaw and/or the roll of the array 30 or of the arrays 50 and 52, while moving the vertical member along the horizontal beam 214 until eventual responses have been acquired along a row of grid positions defined on the object, and then moving the horizontal beam 214 along the length 218 of the basin 220 to position the array 30 or the arrays 50 and 52 for acquiring eventual responses on a next row of grid positions. Defining the scan axis along the length 218 of the basin 220 and defining the index axis along the horizontal beam 214 is also contemplated. Similarly, for an object extending vertically within the basin 214, the scan and index axes could be defined along the vertical member 212 and either along the horizontal beam 214 or along the length 218 of the basin 220. It may be noted, however, that the scan axis and the index axis are not necessarily defined according to any one physical axis of the scanning apparatus 200. The scan and index axes may also be virtual, being for example defined as parametric curves involving the synchronized motion of multiple physical components of the scanning apparatus 200.

The robotic manipulator 210 and the transducers 12 of the array 30 (or the transducers 54a-54h and 56a-56h of the arrays 50 and 52) may be connected by wires (not shown) to the controller 300. The controller 300 may include a screen 302 and a keyboard 304 allowing an operator to control the system 100 and its components.

The controller 300 controls a scanning motion of the array 30 (or of the arrays 50 and 52) to obtain a plurality of measurements for a corresponding plurality of grid positions on the surface 40 of the object. The robotic manipulator 210 has sufficient degrees of freedom to control the position and orientation of the array 30 (or of the arrays 50 and 52). In an embodiment, the enabled transducers 12 of the array 30 emit ultrasonic signals 36 according to a sequence of trigger signals determined by the controller 300, in which case eventual responses are received in a sequence that is consistent with the sequence of trigger signals. In another embodiment, the enabled emitting transducers 54a-54h of the array 50 emit ultrasonic signals 58a-58h according to a sequence of trigger signals determined by the controller 300 and the receiving transducers 56a-56h of the array 52 record the ultrasonic signals 58a-58h that they may detect. The trigger signals are generated in response to monitoring, by the controller 300, of physical axes of the robotic manipulator 210 and of the pitch, yaw and/or roll of the array 30 or of the arrays 50 and 52.

Returning to FIG. 4, when scanning in pulse-echo mode, one of the transducers of the array 30, for example and without limitation the transducer 12a, may be designated by the controller 300 as a master transducer for the array 30. The array 30 may be positioned and oriented in view of the surface 40 of the object so that at least the ultrasonic signal 36a emitted from this master transducer 12a will consistently impinge the surface 40 of the object substantially at a normal angle and so that an eventual response will be reflected substantially directly to be properly detected by the master transducer 12a. Otherwise stated, the array 30 may be positioned so that the master transducer 12a is positioned for emitting an electronic signal 36a having a direction of incidence on the surface 40 of the test object that is substantially aligned with the surface normal vector on a selected grid position of the surface 40. In the example of FIG. 4, when the array 30 is positioned in view of the curved portion 44 of the surface 40 of the object, only the transducers 12a and 12b are considered enabled for acquiring eventual responses. When the array 30 is positioned in view of the flat portion 42 of the surface 40 of the objects, all of the transducers of the array 30 are considered enabled for acquiring eventual response information from the object. It may be noted that, although FIG. 4 shows that the master transducer 12a is positioned near the middle of the array 30, this example is non-limiting and any other transducer may be selected as the master transducer for the array 30.

Similarly, when scanning in through-transmission mode, the controller 300 may designate, for example and without limitation, the emitting transducer 54a as a master emitting transducer 54a for the array 50 of FIG. 5 and position the emitting transducer 54a in view of the top surface 40a of the object to ensure that at least the receiving transducer 56a, designated as master receiving transducer 54a, will be able to detect the ultrasonic signal 58a. Although FIG. 5 shows an example in which the pair of arrays 50 and 52 are maintained in a constant distance and orientation therebetween, it is also possible to use distinct sets of mechanical components to independently support and position the array 50 of emitting transducers 54a-54h and the array 52 of receiving transducers 56a-56h. Consequently, in an embodiment, when the top surface 40a and the bottom surface 40b are not substantially parallel, the master receiving transducer 56a may still be positioned to detect the ultrasonic signal 58a emitted by the master emitting transducer 54a.

In order to simplify the illustration of the present technology, the following description will mainly refer to non-limiting examples using the array 30 of transducers 12 for scanning in pulse-echo mode. The present technology is however applicable to the use of phased array systems and to the use of multiple transducer elements used simultaneously to produce a virtual aperture. The present technology is not only applicable to pulse-echo mode, but also applicable to systems operating in through-transmission mode, in which one array comprising several ultrasonic signal generators is positioned in front of a surface of an object and another array comprising several ultrasonic signal receivers is positioned behind an opposite surface of the object.

In the controller 300, a scan plan is built for the surface 40 (FIGS. 3 and 4) of the object to be scanned. The surface 40 is represented as a surface representation, also called a parametric surface representation, whose input variables u and v are used as virtual scan and index axes and whose content indicates a surface normal vector on the surface 40 of the object at each grid position, designated by the input variables u and v. Information sufficient for the controller 300 to represent the surface 40 may be obtained in various manners, for example and without limitation by using a three-dimensional (3D) laser scanner. In another non-limiting example, the surface representation of the object to be scanned may be provided to the controller 300 using engineering information defined upon conceiving the object. Regardless, at a given grid position determined by respective u and v values, the controller 300 may calculate the position and orientation of the master transducer 12a in view of aligning an ultrasonic signal 36a emitted by the transducer 12a with the surface normal vector at the given grid position. When the scan plan is later executed, the controller 300 will provide commands to the motion controller 216 to position the array 30 accordingly. The controller 300 may thus adapt the position and orientation of the master transducer 12a to allow the master transducer 12a to properly receive an ultrasonic response from the object if a defect is present underneath the surface 40 at the given grid position. While building the scan plan, the controller 300 applies this planned position and orientation to the other transducers 12b, 12c, 12d and 12e of the array 30 and determines which of these other transducers are able to properly receive eventual responses from the surface 40 of the object. In more details, inverse kinematics may be used to calculate the required positions of the physical axes of the robotic manipulator 210 for a position and orientation of the master transducer 12a in view of a given grid position on the surface 40. Forward kinematics may then use the calculated physical axes positions to determine the position and orientations of the other transducers 12 of the array 30. By moving the u and v virtual axes, the system 100 is thus able to move the master transducer 12a of the array 30 over the entire surface 40 of the object, while maintaining a constant path of the ultrasonic signals 36 in the couplant material and while maintaining master transducer 12a in a substantially normal orientation in view of the surface 40 of the object.

The surface representation of the object to be scanned, defined in a u and v space over the surface 40 of the object, is arranged in a scan grid of $N_u$ by $N_v$ discrete grid positions. For each of these positions on the grid, positions of the physical axes of the system 100 are determined using inverse kinematics as described in the previous paragraph. The calculated positions of the physical axes are then used to determine, by using forward kinematics, the position and orientation of each transducer 12 of the array 30, or the position and orientation of each transducer 54 and 56 of the arrays 50 and 52, at coordinates of each grid position. In the case of the pulse-echo mode, for each transducer 12 of the array 30, an intersection between a propagation line of a corresponding ultrasonic signal 36 and the surface 40 of the object is evaluated. For a given transducer 12, there is no intersection if an ultrasonic signal 36 emitted by this transducer cannot reach the surface 40. Similarly in the case of through-transmission mode, for a given pair comprising an emitting transducer 54 and a corresponding receiving transducer 56, there is no intersection if an ultrasonic signal 58 emitted by the emitting transducer 54 cannot reach the top surface 40a or if a direction of propagation of the ultrasonic signal 58 exiting from the bottom surface 40b does not substantially point toward the receiving transducer 56.

Returning to the pulse-echo mode example, if the intersection exists, a distance between the transducer 12 and the entry point of the ultrasonic signal 36 on the surface 40 is calculated. An angle between the propagation line of the ultrasonic signal 36 and the surface normal vector at the entry point is also calculated. Coordinates of a grid position nearest to the entry point are also determined. For each transducer 12 of the array 30, if the intersection exists and if the beam propagation distance and surface entry angle are within specified tolerance, the transducer 12 is marked as enabled at the scan grid coordinate. The list of enabled transducers 12 and corresponding intersection locations on the scan grid are associated with the scan grid positions.

On areas of the object where there is minimal curvature of the surface 40, the entire array 30 of transducers 12 may be used simultaneously to construct scan output data. However, in areas where the curvature of the surface 40 is more pronounced, a subset of the array 30 is deemed enabled. This adaptive method provides that the ultrasonic signals 36 are actually emitted by the transducers 12 when they may reach the object at acceptable angles while allowing for accelerated scan speed in areas of the surface 40 where curvature is low.

Software in the controller 300 builds the scan plan from the list of enabled transducers 12 associated with the various positions on the scan grid. A scan plan item contains the following information: u and v virtual axes coordinates at the start and end of motion of the robotic manipulator 210 and a list of acquisition items. In turn, each acquisition item contains the following information: physical axis and axis position at which to send trigger signals to the array 30, and a list of enabled transducers 12 and their corresponding grid positions on the scan grid. The scan plan is built to minimize the scan duration while providing that each position on the scan grid is filled at the end of the scan.

For scanning the object, the controller 300 executes each item of the scan plan in a sequence. For each item, the list of physical axes to monitor and the positions at which to send the trigger to array 30 are sent to a trigger module (shown on a later Figure), and motion of the robotic manipulator 210 is initiated on the virtual u and v axes to reach the scan or indexing movement destination corresponding to each grid position. A trigger may be generated at each of the grid positions. Whenever the array 30 receives a trigger, it causes the enabled ones of the transducers 12 to sequentially emit ultrasonic signals 36. The enabled transducers 12 may collect eventual responses if the ultrasonic signals 36 are reflected by defects in the test object. The array 30 then sends recordings of the collected responses, in the order of their detection, to the controller 300. The controller 300 then assigns each collected response from the received sequence to the correct position on the scan grid. The movement of the robotic manipulator 210 may be continuous, as there is no need to stop its movement at each scan grid position given the brevity of the emission of the ultrasonic signals 36 and of the collection of the responses.

Figure 7:
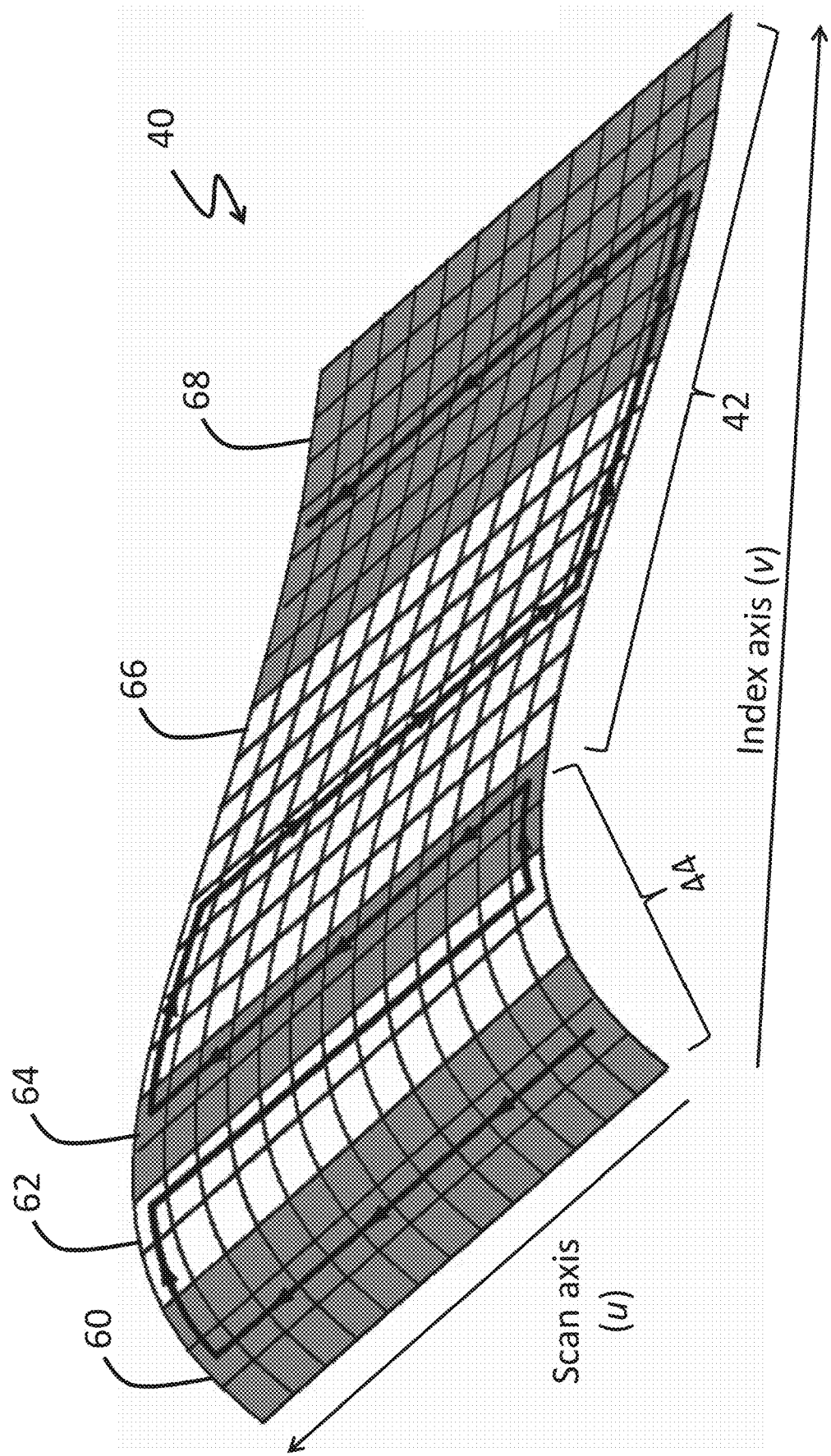
FIG. 7 illustrates a scanning path of the array of FIG. 3 with a varying number of enabled ultrasonic transducers, in accordance with an embodiment of the present technology.

As a non-limiting example, FIG. 7 illustrates a scanning path of the array of FIG. 3 with a varying number of enabled ultrasonic transducers, in accordance with an embodiment of the present technology. FIG. 7 illustrates the scan plan and adaptive filling of multiple index locations in parallel during scan passes and shows the path of the master transducer 12a of the array 30 over the grid positions defined on the surface of the object. FIG. 7 provides a three-dimensional (3D) representation of the surface 40 of the object introduced in the description of FIG. 3. 22 rows are defined along the index axis ($N_v$=22), each row including 13 grid positions ($N_u$=13). FIG. 7 is a simplified example in which there is no significant curvature defined along the scan axis. In other examples, a particular object may have curvatures defined in any direction. Scanning a particular object may require defining greater or lesser numbers of grid positions.

As in the case of FIG. 2, the array 30 of transducers 12 is moved along the scan axis from one end to an opposite end of the surface 40 of the object, before shifting its position along the index axis and being moved further along the scan axis, in an opposite direction. In more details, in the example of FIG. 7, the array 30 of transducers 12 covers the surface 40 of the object in five scanning passes referenced as 60, 62, 64, 66 and 68. The scanning passes 60, 62 and 64 cover the curved portion 44 of the surface 40 and the scanning passes 66 and 68 cover the flat portion 42 of the surface 40. Based on the surface normal vectors indicated in the surface representation of the object for grid positions in the area covered by the scanning pass 60, the controller 300 has determined that only three transducers 12 of the array 30 may properly emit ultrasonic signals 36 reaching the surface 40 of the test object at acceptable directions of incidence and are thus marked enabled along the scanning pass 60. Ultrasonic signals 36 that would be emitted from additional transducers 12 could only reach the surface 40 at unacceptable directions of incidence in the area covered by the scanning pass 60 so remaining transducers 12 are marked disabled along the scanning pass 60. Similarly, only two transducers 12 of the array 30 may emit ultrasonic signals reaching the surface 40 at acceptable directions of incidence in areas covered by each of the scanning passes 62 and 64. Thereafter, as the array 30 moves over the flat portion 42 of the surface 40, eight transducers 12 of the array 30 may properly emit ultrasonic signals 36 reaching the surface 40 at acceptable directions of incidence in an area covered by the scanning pass 66. Finally, seven transducers 12 of the array 30 may properly emit ultrasonic signals 36 reaching the surface 40 at acceptable directions of incidence in an area covered by the scanning pass 68. It may be noted that there is no need to use all 8 transducers of the array 30 in the last scanning pass 68 because the limit of the surface 40 of the object has been reached.

FIG. 7 therefore illustrates a sequence of 5 scanning passes sufficient to scan the entire surface 40 of the object. This may be compared to a more conventional technology, in which 2 transducers of the array 30 might be selected based on the highest curvature of the surface 40 of the object, in the area of the scanning passes 62 and 64, requiring a total of 11 scanning passes to cover the 22 rows of grid positions defined along the index axis.

In the illustration of FIG. 7, the width in terms of a number of enabled transducers 12 in each of the scanning passes 60 to 68 is constant, the surface 40 having a simple configuration. Other embodiments are contemplated, being particularly useful for scanning more complex surfaces. The controller 300 may define a scan trajectory so that all points of the scan grid are covered at the end of the scan. In one embodiment, the scanning may be slowed down in some highly curved areas of the surface 40 of the object in order to increase the scanning resolution. For example, the array 30 may be oriented as needed so that at least the master transducer 12a is properly oriented to detect an eventual response resulting from the eventual presence of a defect in the test object at a particular grid position. In the same or another embodiment, partial scanning lines may be defined on edges of the scan grid, so that particular grid positions being missed in the course of a broader scan may be filled by backtracking the position of the array 30 to perform mini scans over missed grid positions.

For example, in an embodiment, the width of the scanning paths may be made to vary along the scan axis. FIG. 8 illustrates another scanning path of an array having four transducers with a varying number of enabled ultrasonic transducers, in accordance with an embodiment of the present technology. An object has a surface 70 in which various areas have various levels of curvature distributed both along the index axis, as in the case of FIG. 7, and also along the scan axis. Shaded areas 72 have complex curvatures while unshaded areas 74 are relatively flat. An array (not shown) includes 4 transducers and is thus able to scan a width of 4 adjacent grid positions 76 of the surface 70. Using the same method as illustrated in FIG. 7, successive scanning paths distributed along the index axis may have widths of 2, 2, 1, 3 and then 4 transducers, respectively, these numbers reflecting the minimum scannable width defined along the index axis for some parts of the areas 72.

In the example of FIG. 8, successive positions 78 of the array may follow a first scanning path 80 having a 4-transducer width along a part of the scan axis. A second scanning path 82 and a third scanning path 84 each have 2-transducers width on a remainder of the scan axis beyond the first scanning path 80. in the same manner, the array may be positioned for a fourth scanning path 86 having a 1-transducer width and a fifth scanning path 88 having a 3-transducer width. Sixth and seventh scanning paths 90 and 92, which extend over the flat area 74, each have a 4-transducer width. The scanning paths may not be in the order as listed above. For example and without limitation, executing the broader scans of paths 80, 90 and 92 in any order at first, and then executing the narrower scans of paths 82, 84, 86 and 88 in any order, is also contemplated.

While embodiments introduced hereinabove show that the arrays of transducers are maintained parallel to the index axis, other variants are also contemplated. FIGS. 9A to 9E illustrate a further technique for scanning a surface using varying number of enabled ultrasonic transducers, in accordance with an embodiment of the present technology. A surface 400 includes grid positions 402a (darkened on FIG. 9A), areas contained in these grid positions 402a being fairly flat. On FIG. 9A, an array 410 containing 8 transducers 412 is placed in a first position of a master transducer 412a. In this example, the array 410 is not parallel to any of the scan and index axes. In the first position, the 8 transducers 412 are all in favorable stance in view of the surface 400 to transmit ultrasonic signals on corresponding grid positions 402a, which exclude grid positions 404, 406 and 408, and to eventually receive responses from the same positions if defects are encountered by the ultrasonic signals. Between FIGS. 9A and 9B, the master transducer 412a passes over a highly curved section of the surface 400, forcing the controller 300 to significantly change an orientation of the array 410. On FIG. 9B, the array 410 has been moved in a next position along the scan axis, allowing all 8 transducers 412 to acquire eventual responses from other grid positions 402b (although some overlap may exist between the grid positions 402a ad 402b covered in FIGS. 9A and 9B, occurrence of such overlap may depend on the actual conditions of the scanning sequence).

Figure 9A:
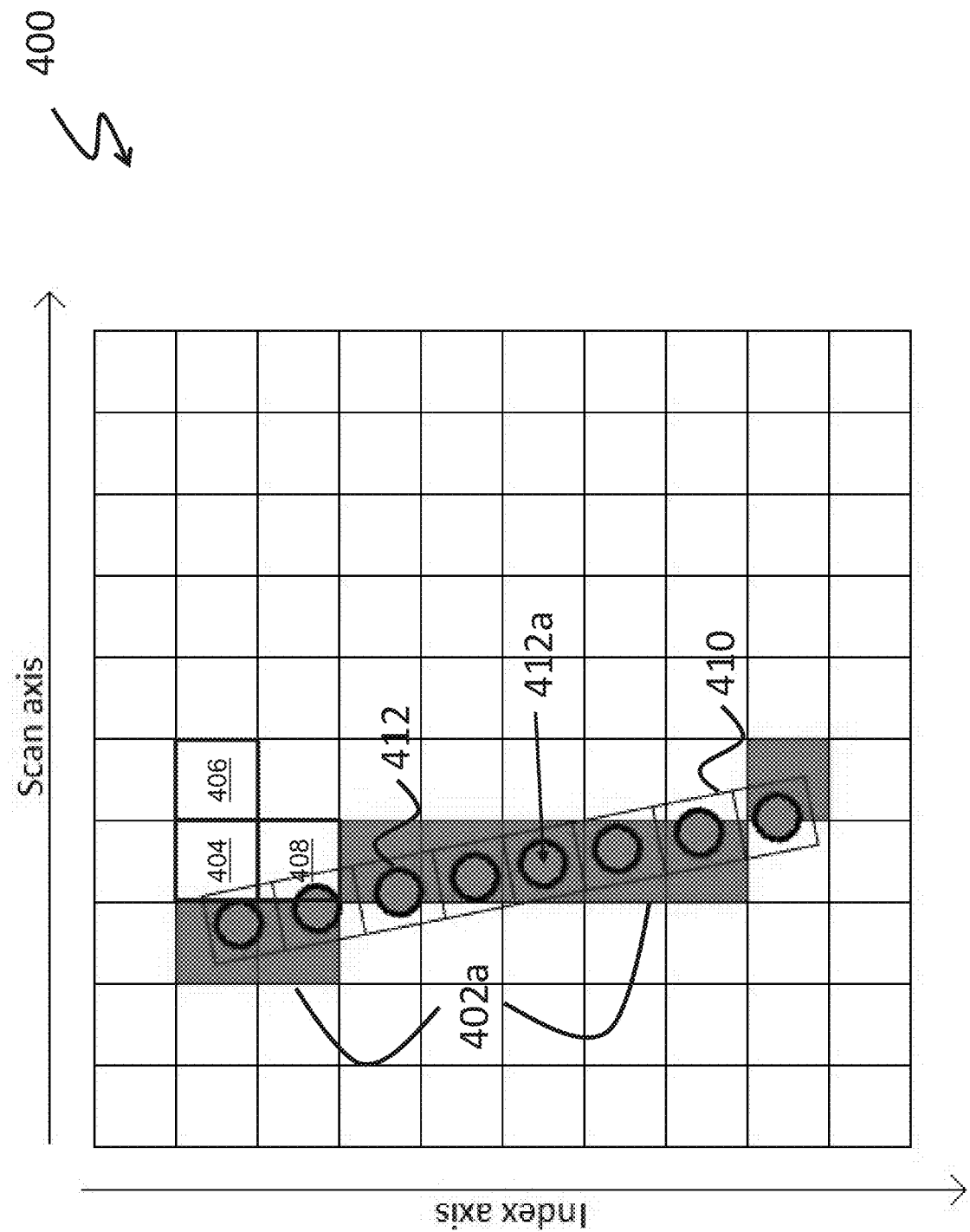
Figure 9B:
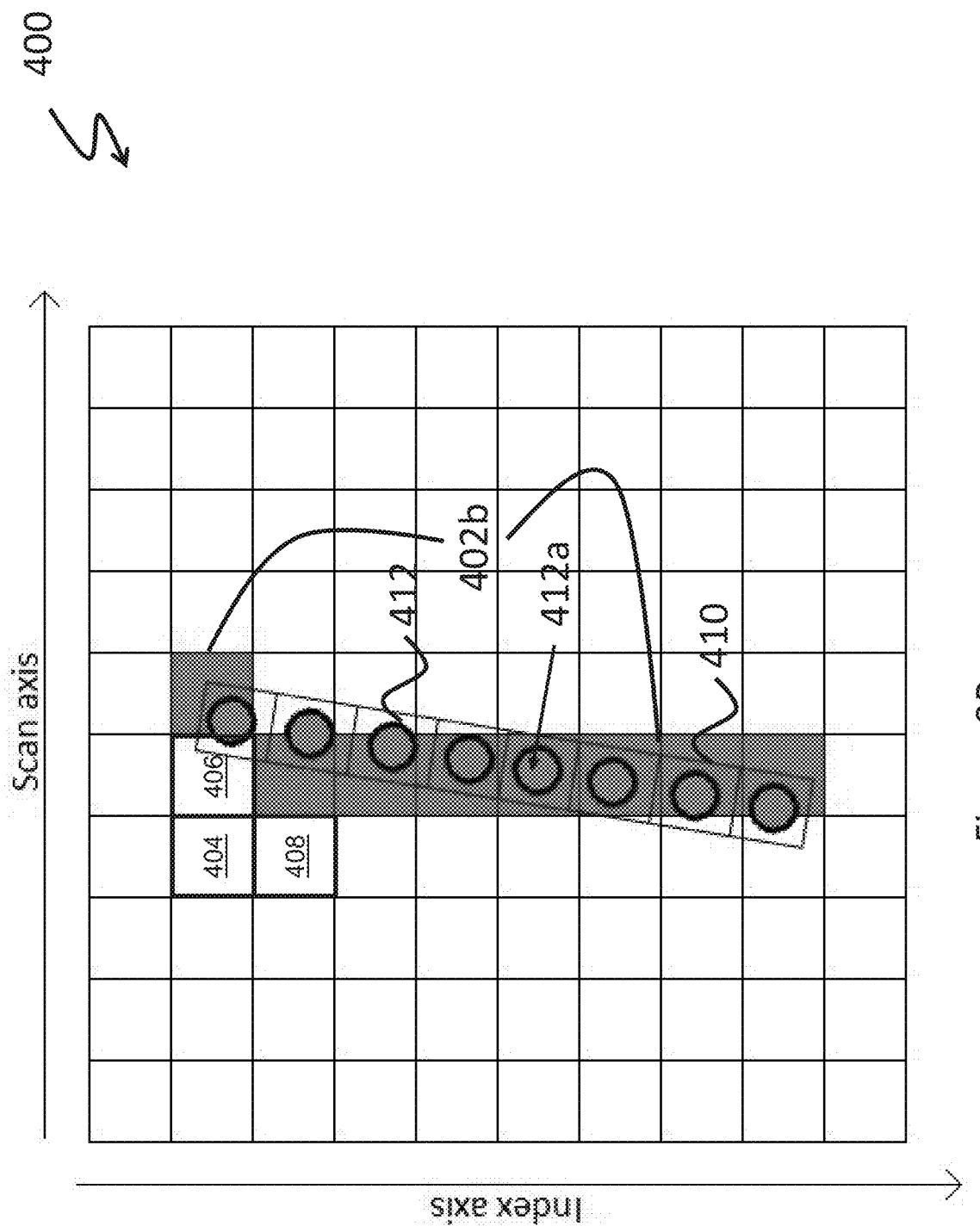
Figure 9C:
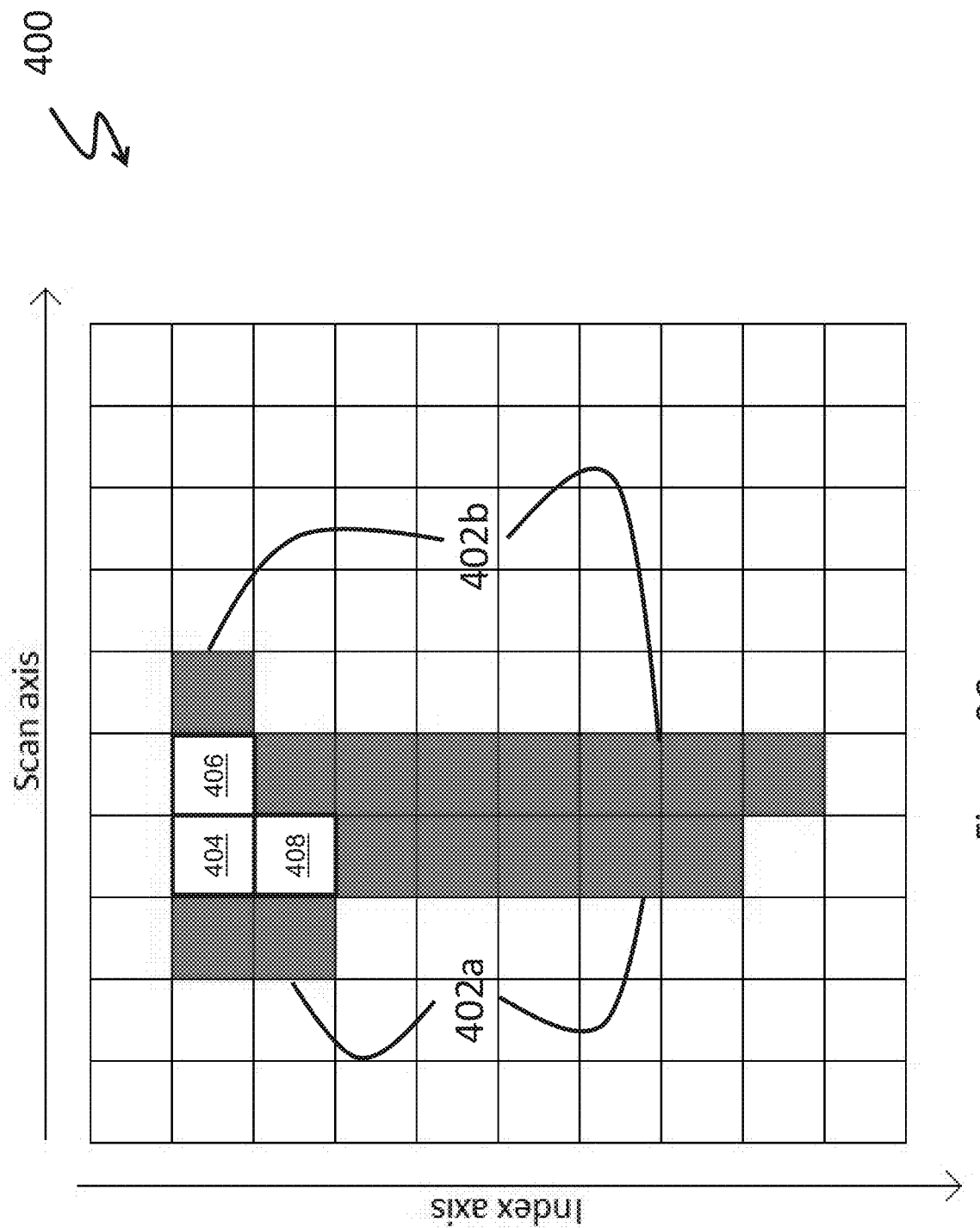
Figure 9D:
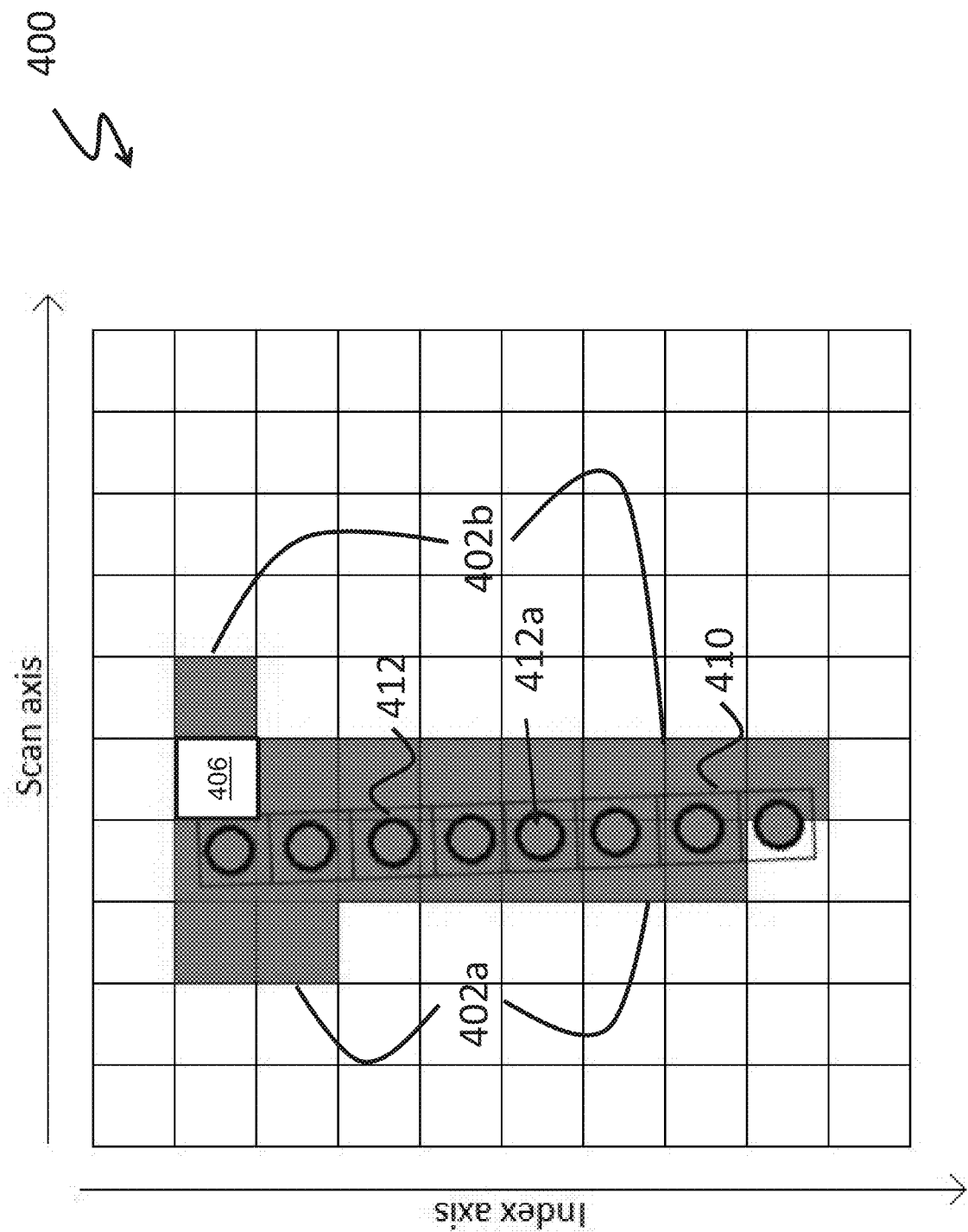

FIG. 9C shows a sum of the grid positions 402a and 402b successfully covered by the operations described in FIGS. 9A and 9B, the grid positions 404, 406 and 408 remaining uncovered at that time. This gap may be overcome by slowing down the movement of the array 410 between the positions of the master transducer 412a shown in FIGS. 9A and 9B. FIGS. 9D and 9E illustrate results of intermediate scans (or 'mini scans') that may be obtained in the transition of the array 410 between the positions of FIGS. 9A and 9B. FIG. 9D shows that the array 410 is oriented in a first intermediate scan position, in orderto acquire eventual responses from the grid positions 404 and 408. Additional eventual responses may optionally be received from previously covered grid positions 402a and/or from the grid positions 40b that will be covered when the array 410 reaches the orientation illustrated on FIG. 9B. FIG. 9E shows that the array 410 is oriented in a second intermediate scan position, in order to acquire an eventual response from the grid position 406, if a defect is present in that grid position. It should be understood that the actual sequence of movements of the array 410 follows the positions shown on FIGS. 9A, 9D, 9E and 9B, in that order.

FIGS. 9A to 9E therefore collectively show that the grid positions 404, 406 and 408 that would not be covered by scanning operations involving the entire array 410 for two successive grid positions of the master transducer 412a may be covered by intermediate scans aimed at filling empty positions on the surface 400. Although the motion of the array 410 is slowed down somewhat between the positions of FIGS. 9A and 9B, to cover the grid positions 404, 406 and 408 in the intermediate scans of FIGS. 9D and 9E, the overall scanning process of the surface 400 may still be performed in less time when compared to a sequence in which the operations of FIGS. 9A and 9B would be followed by a repositioning of the array 410 for capturing eventual responses from the grid positions 404, 406 and 408.

Figure 10A:
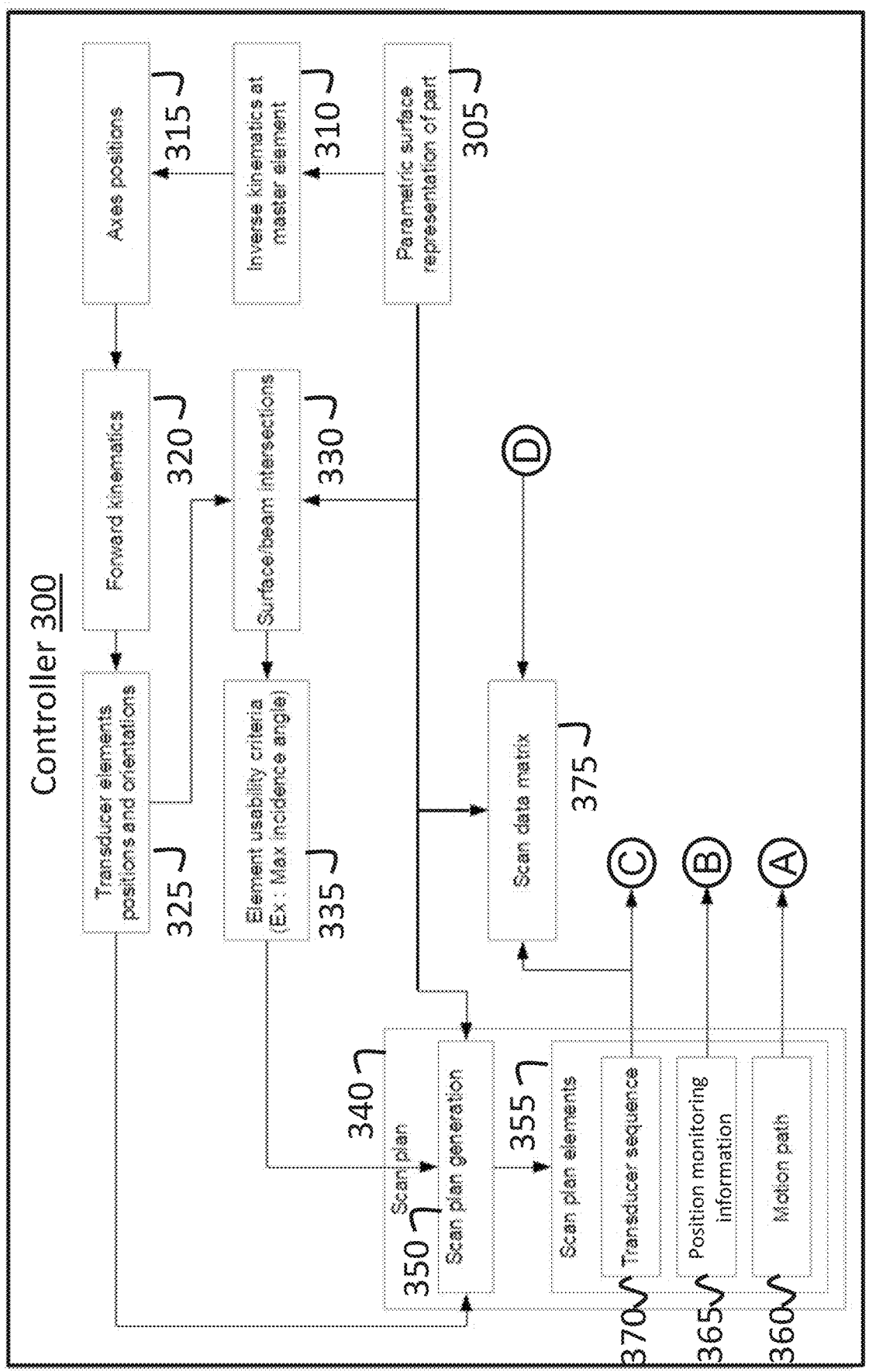
FIGS. 10A and 10B are a block diagram of a system for scanning an object using multiple channels, in accordance with an embodiment of the present technology.
Figure 10B:
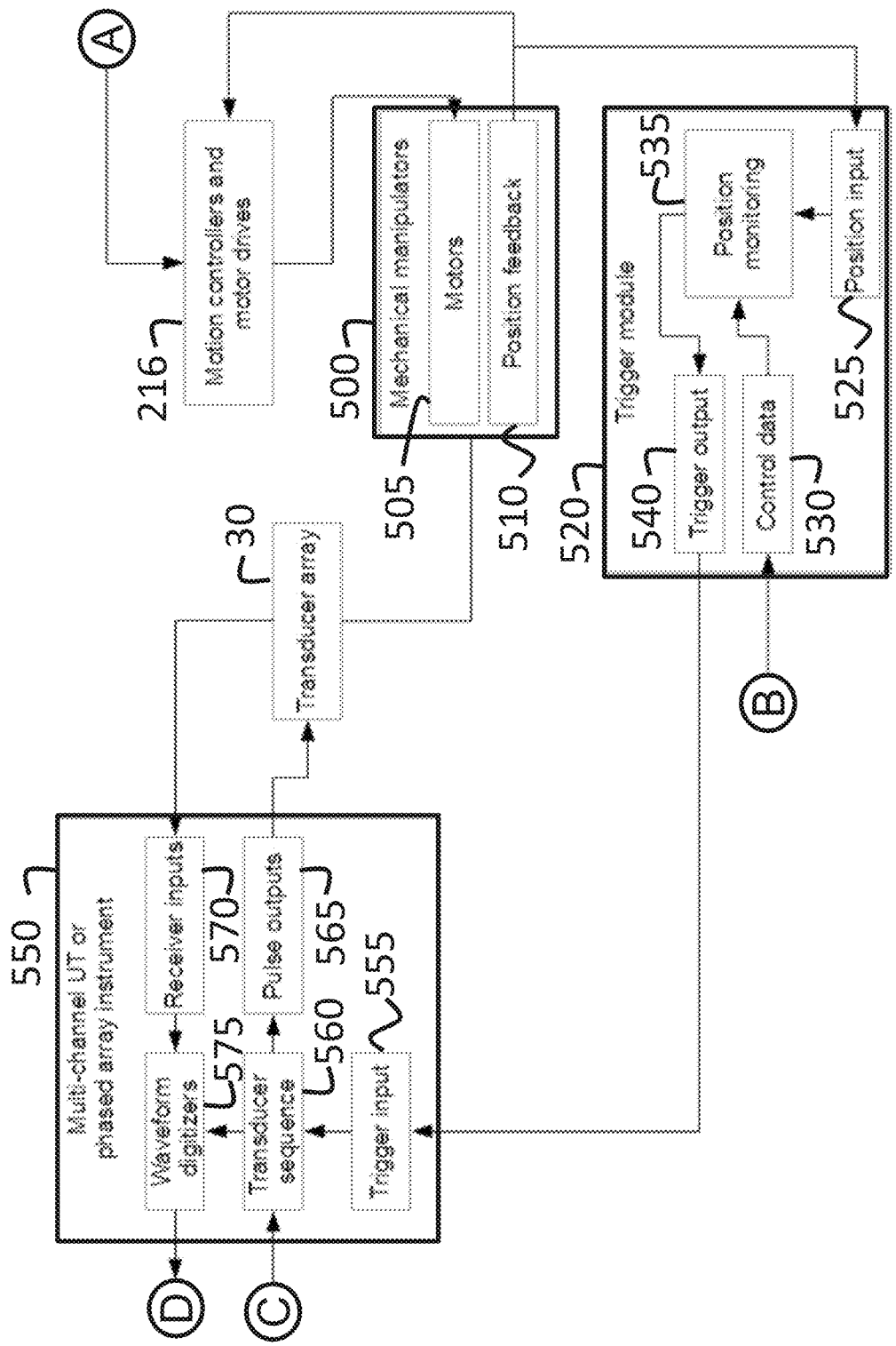

FIGS. 10A and 10B are a block diagram of a system for scanning an object using multiple channels, in accordance with an embodiment of the present technology. The scanning system 100 comprises the controller 300, the array 30 of transducers 12, the motion controller 216, a set of mechanical manipulators 500 adapted for moving the array 30 along up to 6 degrees of freedom, a trigger module 520 adapted for receiving position monitoring information from the controller 300 and to send triggers to an array controller 550 when the array 30 is properly positioned. The array 30 as shown on FIG. 10B may be substituted by the pair of arrays 50 and 52 for operating the scanning system 100 in through-transmission mode. Considering that arrays 50 and 52 may be separately supported and may be moved in relative independence from one another, an enhanced set of mechanical manipulators 500 may move the arrays 50 and 52 along up to 6 degrees of freedom per array.

In particular, FIG. 10A illustrates a software structure of the controller 300. In operation, the scanning process starts with defining a parametric surface representation 305 of the object to be scanned. In this representation, each grid position is referenced along the virtual axes u and v on the surface 40 of the test object and defines a position on the surface of the object and a surface normal vector of the surface 40 of the object at that grid position. For scanning of the object in pulse-echo mode, a single position on the surface of the object and a corresponding surface normal vector on the surface 40 of the object that will be exposed to ultrasonic signals is sufficient for each grid position. For scanning of the object in through-transmission mode, surface positions and surface normal vectors may be defined on opposite surfaces of the object, at each grid position. Inverse kinematics 310 are calculated according to relationships between the master transducer 12a, the position on the surface of the object and the surface normal vector on the surface 40 of the object each of the grid positions defined in the parametric surface representation 305. Results of this calculation are used to calculate positions 315 of the axes of the scanning apparatus 200, along its several degrees of freedom, for each of the grid positions of the master transducer 12a, in turn leading to the calculation of forward kinematics 320 to provide positions and orientations 325 of the various other transducers 12 of the array 30 for each of the grid positions of the master transducer 12a.

For a given position of the master transducer 12a, a calculation 330 of potential intersections between the ultrasonic signals 36 emitted by the various transducers 12 of the array 30 and the surface of the object to the scanned is obtained based at least in part on the parametric surface representation 305 of the object and on the positions and orientations 325 of the transducers 12 of the array 30. Other considerations impacting the calculation of potential intersections may include the actual physical construction of the array 30 and/or a planned distance between the array 30 and the surface of the object at the given grid position of the master transducer 12a. A result of the calculation 330 is provided to a transducer usability criteria evaluator 335 that determines, for example on the basis of an impinging angle of an ultrasonic signal 36 on the surface 40 of the object, which transducers 12 would be able to emit ultrasonic signals 36 reaching the surface 40 at acceptable directions of incidence and be able to detect eventual responses 39 that would eventually be received from respective grid positions. In addition to the direction of incidence, other criteria applied by the usability criteria evaluator 335 may comprise, for example, a calculated distance between a given transducer 12 and the surface 40 of the object. In an embodiment, an assumption may be made that at least the master transducer 12a can be positioned to be consistently able to emit an ultrasonic signal reaching the surface 40 at an acceptable direction of incidence and to detect an eventual response resulting from its emission of an ultrasonic signal 36a at the given position of the master transducer 12a. The usability criteria evaluator 335 provides a list of enabled transducers 12 for the given grid position of the master transducer 12a to a scan plan function 340.

In an embodiment, when the list of enabled transducers 12 for a first grid position of the master transducer 12a includes a second or more grid positions, evaluation of a next grid position of the master transducer 12a may omit the second or more grid positions. This is due to the fact that one or more additional transducers 12 of the array 30 are useable to detect eventual responses from the second or more grid positions and it would be redundant to plan the positioning of the master transducer 12a in view of the second or more grid positions.

In another embodiment, lists of enabled transducers 12 may be obtained considering an eventual placement of the master transducer 12a in view of each of the grid positions. A result of this evaluation may show a plurality of potential overlaps between the lists of enabled transducers 12. Heuristics may be used to select which grid positions for positioning the master transducer 12a will eventually be sufficient to fully scan the object while minimizing the actual overlaps. An algorithm allowing to define a scan plan for fully scanning the object is defined hereinbelow.

The scan plan function 340 generates the actual scan plan 350 from the list of grid positions defined in the parametric surface representation 305, determining which ones of the transducers 12 of the array 30 are enabled at each grid position using the list from the usability criteria evaluator 335. A list 355 of elements defined for each position of the scan plan 350 includes a motion path sequence, position monitoring information and a transducer sequence.

Information from the motion path sequence is provided (reference 'A') to the motion controller 216 by an output 360 for controlling movements of the array 30. In particular, this information may cause the array 30 to move so that the master transducer 12a is moved to its next planned grid position. Position monitoring information is provided (reference 'B') by an output 365 for causing the trigger module 520 to initiate the emission of ultrasonic signals 36 by the enabled transducers 12 of the array 30 when the position of the array 30 matches the position monitoring information along all defined degrees of freedom for the array 30. The transducer sequence is provided (reference 'C') by an output 370 to cause the array controller 550 to control the actual sequence of emission of ultrasonic signals 36 by the enabled transducers 12 of the array 30. FIG. 10B illustrates how the outputs from the controller 300, including the motion path sequence information from the output 360, the position monitoring information from the output 365 and the transducer sequence from the output 370 are handled by other components of the scanning system 100.

The controller 300 receives signals reflecting the collected eventual responses (reference 'D') from the array controller 550 and records them in a scan data matrix 375. The scan data matrix 375 matches the signal information related to the eventual responses with the corresponding grid positions reflected by the parametric surface representation 305. Given that more than one enabled transducer 12 may have collected eventual responses at each grid position of the master transducer 12a, the scan data matrix 375 uses the transducer sequence from the output 370 to relate each eventual response to the corresponding enabled transducer 12.

Turning now to FIG. 10B, the motion controller 216 receives the information of the motion path sequence from the output 360 of the controller (reference 'A') for each successive grid position of the master transducer 12a on the scan plan 340. In an embodiment, the motion path sequence is meant to be continuous or substantially continuous, so the information received at the motion controller 216 may cause the array 30 (or the arrays 50, 52) to be moved from one grid position to a next grid position in a smooth and substantially continuous fashion. Considering one particular grid position of the master transducer 12a, the motion controller 216 provides the motion information to the mechanical manipulators 500, effectively driving motors 505 to displace one or more of the components of the robotic manipulator 210. The vertical member 212 may move up or down, rotate along its own axis, and/or move horizontally along the horizontal beam 214. The horizontal beam 214 may move horizontally along the length 218 of the basin 220. The mechanical support of the array 30 may change its vertical angle (pitch) and/or its rotational angle (roll). A position feedback sensor 510 reports the actual position and orientation of the array 30, along up to 5 or 6 degrees of freedom (or each of the arrays 50 and 52 along up to 5 or 6 degrees of freedom per array), to the motion controller 216, which in turn may cause the motors 505 to finely tune the positioning of the array 30 according to the information received from the controller 300. The actual position of the array 30 is also reported to a position input 525 of the trigger module 520.

Continuing the description of FIG. 10B while still considering the same particular grid position of the master transducer 12a, the trigger module 520 also receives position monitoring information (reference 'B') from the output 365 of the controller 300 at a control data input 530. A position monitor 535 considers the actual position and orientation of the array 30 as reported by the position input 525 and verifies that it is consistent with the position monitoring information received at the control data input 530. Provided that the array 30 is properly positioned, the position monitor 535 causes a trigger output 540 to be provided to the array controller 550.

The array controller 550 may for example be a multichannel ultrasonic instrument or a phased array instrument. For illustration purposes, the array controller 550 is shown as a distinct element from the array 30 of transducers 12. In an embodiment, the array controller 550 and the array 30 may be physically integrated in a same device. The trigger output 540 is provided at a trigger input 555 on the array controller 550. The transducer sequence (reference 'C') for the particular grid position of the master transducer 12a is received from the output 370 of the controller 300 at a transducer sequence input 560 of the array controller 550. The array controller 550 causes pulses to be provided from an output 565 to the enabled transducers 12 of the array 30 according to the transducer sequence. The transducer sequence is defined so that only the transducers 12 that are enabled at the particular grid position of the master transducer 12a will emit ultrasonic signals 36 and eventually collect responses (or, equivalently, the transducer sequence may be defined so that only the enabled emitting transducers 54 will emit ultrasonic signals 58 for detection at the receiving transducers 56 of the same pairs). The order of emission of the ultrasonic signals 36 is defined by the transducer sequence so that the controller 300 will be able to associate each reported response to a corresponding grid position.

In an embodiment, the transducer sequence may be defined so that delays between successive ultrasonic signals 36 emitted by the enabled transducers 12 (or the enabled emitting transducers 54) are selected to minimize or avoid crosstalk between successive responses eventually detected by the enabled transducers 12 (or ultrasonic signals 58 detected by the receiving transducers 56) without slowing down the scanning process. Given the speed of sound waves in the medium (e.g. water) and given the usually short distances between the transducers 12 (or 54 and 56) and the object being scanned, successive ultrasonic signals of the transducer sequence may be emitted within delays of a few microseconds. Consequently, once the array 30 (or arrays 50, 52) is properly positioned for particular grid position of the master transducer 12a, all enabled transducers 12 at that grid position may emit their respective ultrasonic signals 36 and eventually receive corresponding responses without having to stop the motion of the robotic manipulator 210 that supports the array 30. Otherwise stated, the duration of transducer sequence may be made to be sufficiently short that the transducers 12 that are defined to be enabled when the master transducer 12a is at the particular position will remain enabled despite the motion of the array 30 in the course of the transducer sequence corresponding to a given trigger output 540.

The eventual responses collected by the enabled transducers 12 of the array 30 (or by the enabled receiving transducers 56 of the array 52) are reported to a receiver input 570 of the array controller 550. A waveform digitizer 575 converts the collected responses in digital form and reports the collected responses to the scan data matrix 375 of the controller 300 for recording.

After the controller 300 has recorded the collected responses obtained at the particular grid position of the master transducer 12a, the array 30 arrives at a next grid position of the master transducer 12a, according to the scan plan 340. The scan plan 340 may be completed when transducer sequences have been executed on all grid positions defined in the parametric surface representation 305 of the object to be scanned.

Figure 11:
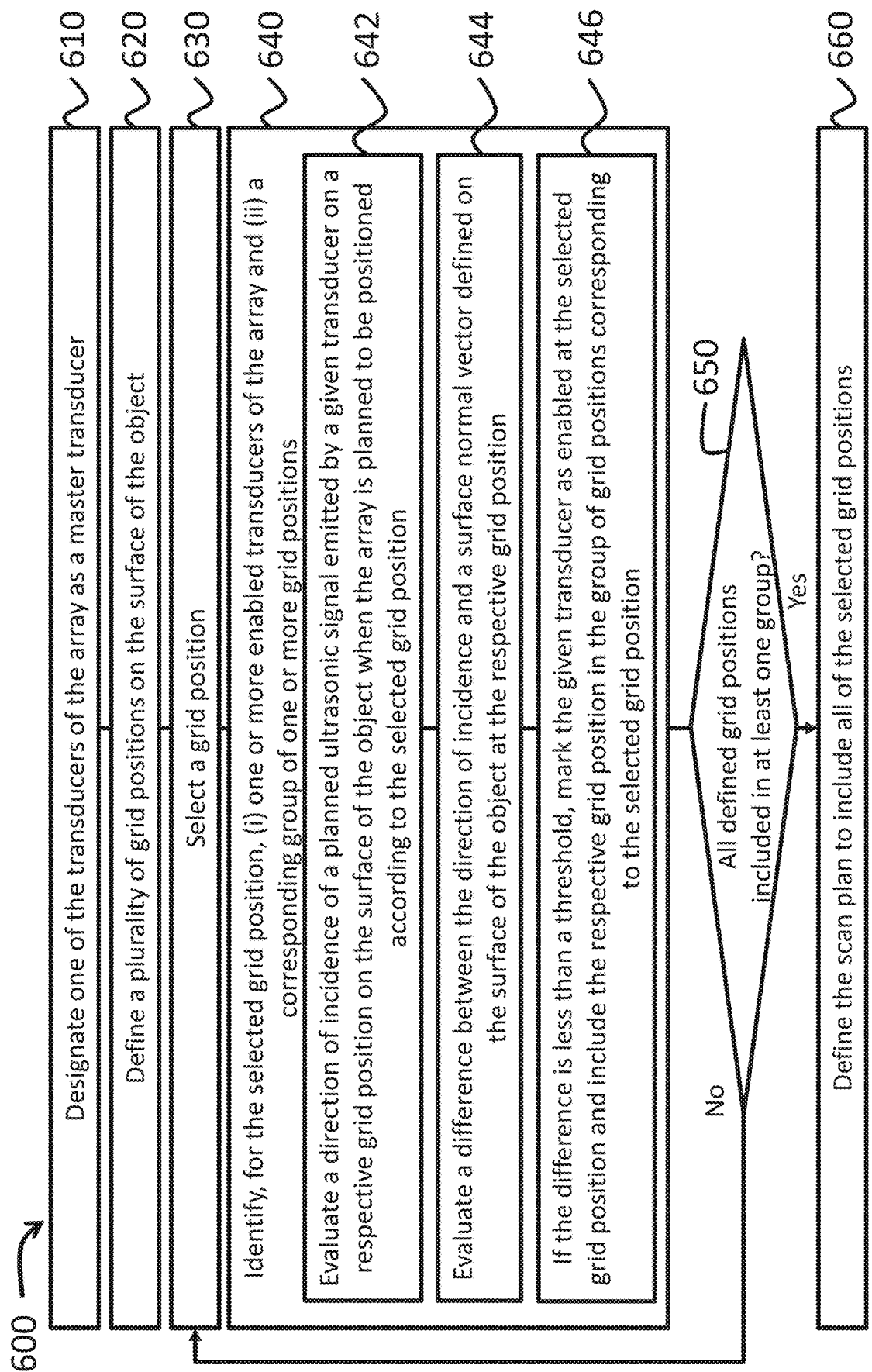
FIG. 11 is a sequence diagram showing operations of a method for preparing a scan plan for scanning an object, in accordance with an embodiment of the present technology.

FIG. 11 is a sequence diagram showing operations of a method for preparing a scan plan for scanning an object, in accordance with an embodiment of the present technology. On FIG. 11, a sequence 600 comprises a plurality of operations, some of which may be executed in variable order, some of the operations possibly being executed concurrently, some of the operations being optional. The sequence 600 may be executed prior to actually scanning the surface 40 of the object and, for this reason, the sequence 600 is described with reference to planned positions of the array 30 in view of various grid positions on the surface 40.

Operation 610 may comprise designating one of the transducers 12 of the array 30, for example the transducer 12a, as a master transducer. Then at operation 620, a plurality of grid positions is defined on the surface 40 of the object. The plurality of grid positions may cover a part of the entirety of the surface 40 of the object. This definition of the plurality of grid positions may be based on various sources for a surface representation of the object to be scanned. The following operations define an algorithm for defining the scan plan so that the plurality of grid positions are covered.

A first grid position is selected at operation 630. At operation 640, for the selected grid position, a number of enabled transducers 12 of the array 30 of ultrasonic transducers are identified. At the same time, a corresponding group of grid positions is also identified. In an embodiment, the group of grid positions includes grid positions from which eventual responses are collectively detectable by the enabled transducers 12. Usually, the number of grid positions in a group corresponding to a selected grid position may be less than or equal to the number of transducers 12 that are enabled at that grid position. Each transducer 12 of the array 30 may be determined to be enabled if determined to be able to collect, from its respective grid position, an eventual response to a planned ultrasonic signal emitted by this transducer 12 when the array 30 is planned to be positioned according to the selected grid position, the response being received following a limited deviation of the ultrasonic signal on the surface 40 of the object. The deviation of the ultrasonic signal on the surface 40 of the object is determined to be sufficiently limited provided the ultrasonic signal impinges substantially perpendicularly on the surface of the 40.

In this operation 640, a given transducer 12 may be enabled wholly or in part based on surface normal vector at the respective grid position defined in the parametric surface representation 305 of the object.

Operation 640 may include one or more of sub-operations 642, 644 and 646, which are executed for each given transducer 12 of the array 30. Sub-operation 642 comprises, for each given transducer 12, evaluating a direction of incidence of a planned ultrasonic signal emitted by the given transducer 12 on a respective grid position on the surface 40 of the object, when the array 30 is planned to be positioned according to the selected grid position. Sub-operation 644 comprises evaluating, for the given transducer 12, a difference between the direction of incidence and a surface normal vector defined on the surface 40 of the object at the respective grid position. Provided that the difference is less than a threshold, the given transducer is marked as enabled at the selected grid position and the respective grid position is included in the group of grid positions corresponding to the selected grid position at sub-operation 646.

The enablement of each given transducer 12 is evaluated by the controller 300 based on the surface normal vector defined at the given grid position. Should a defect be present within the test object underneath the surface 40 at the given grid position, a response would be expected to reach the given transducer 12, which is therefore deemed enabled. In sub-operation 642, the controller 300 sets the planned position and/or orientation of the array 30 so that the direction of incidence of a planned ultrasonic signal emitted by the master transducer 12a is aligned with a surface normal vector defined on the surface of the object at the selected grid position, the master transducer 12a thereby being enabled for the grid position selected at operation 630. The controller 300 makes the same or equivalent evaluation for the other transducers 12 of the array 30, without modifying the planned position and/or orientation of the array 30, so that the other transducers 12 may independently be determined to be enabled or disabled for this position and/or orientation of the master transducer 12a.

In through transmission mode, a pair comprising a given emitting transducer 54 and a corresponding receiving transducer 56 is considered enabled if a path taken by an ultrasonic signal 58 emitted by the given emitting transducer 54 can reach the corresponding receiving transducer 56. The usability of the pair comprising the given emitting transducer 54 and the corresponding receiving transducer 56 is evaluated by the controller 300 based on the respective positioning of the arrays 50 and 52 in view of the position selected at operation 630. As seen in the description of FIG. 5, ultrasonic signals 58 may reach the top surface 40a of the test object at a direction of incidence 6, which may or may not be parallel to the surface normal vectors on respective grid positions, and still be able to reach the receiving transducers 56. The controller 300 calculates the planned position and/or orientation of the arrays 50 and 52 so that at least the pair comprising the emitting transducer 54a and the receiving transducer 56a is enabled for a selected grid position. The controller 300 then makes the same or equivalent evaluation for the other pairs of transducers of the arrays 50 and 52, without modifying the planned position and/or orientation of the arrays 50 and 52, so that the other pairs of transducers 54 and 56 may independently be determined to be enabled or disabled for this position and/or orientation of the master transducer 12a.

Figure 12:
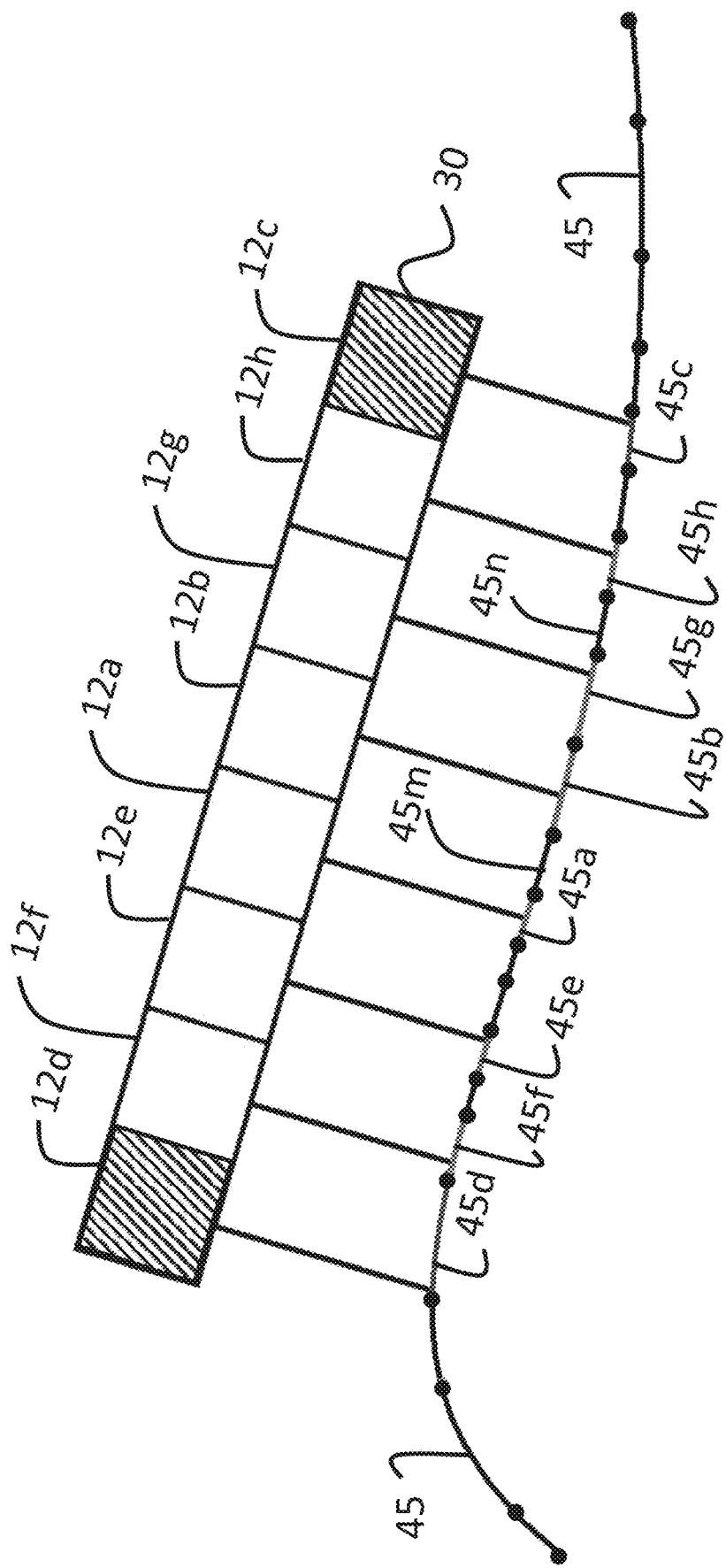
FIG. 12 illustrates an example of the definition of a group of grid positions corresponding to a selected grid position, in accordance with an embodiment of the present technology.

FIG. 12 illustrates an example of the definition of a group of grid positions corresponding to a selected grid position, in accordance with an embodiment of the present technology. Any number of grid positions 45 may be defined on the surface 40 of the object. The size of the grids may not be constant over the surface 40 because, for example, the grid size may be determined according to a desired resolution for scanning a particular region of the surface 40. In the example of FIG. 12, the array 30 includes eight transducers 12a-12h, of which the transducer 12a is the master transducer. The array 30 is positioned in view of the surface 40 of the object so that the master transducer 12a is in view of a selected grid position 45a. In the particular example, the transducers 12a, 12b, and 12e-12h are useful for acquiring eventual responses from a group of grid positions including grid positions 45a, 45b and 45e-45h when the array 30 is at the selected grid position 45a. Directions of incidence of ultrasonic signals emitted by the transducers 12c and 12d are such that these transducers are not enabled for acquiring eventual responses from the grid positions 45c and 45d. Given the spacing between the various grid positions 45, some of the grid positions 45 are not part of the group, for example grid position 45m between the grid positions 45a and 45b, and grid position 45n between the grid positions 45g and 45h. Interleaving may be used to ensure that the grid positions that are not captured when the master transducer 12a is in view of the grid position 45a will be captured when the master transducer 12a is moved to another proximate location. It may be noted that, in the case of a grid position having a broad size, more than one of the transducers 12a-12h might be able to detect eventual responses from the same grid position.

Returning to FIG. 11, operation 650 determines whether all grid positions defined on the surface 40 of the object are effectively included in at least one of the groups of grid positions. If some grid positions are not included in any of the groups, the sequence continues at operation 630 where a new grid position is selected. In more details, as the successive grid positions are selected at operation 630, various numbers of enabled transducers 12 of the array 30 of ultrasonic transducers identified at operation 640 are included at sub-operation 646 in successive groups of grid positions. Therefore, operation 650 verifies whether all of the grid positions defined at operation 620 have been included in at least one of the groups defined at successive instances of sub-operation 646. When all of the grid positions defined on the surface 40 of the object are included in at least one of the groups of grid positions, the sequence 600 terminates with defining, at operation 660, the scan plan to include all of the selected grid positions. As scanning is performed by moving the array 30 along the scan plan, all defined grid positions will be scanned because they will have been included in the various groups of grid positions.

Figure 13A:
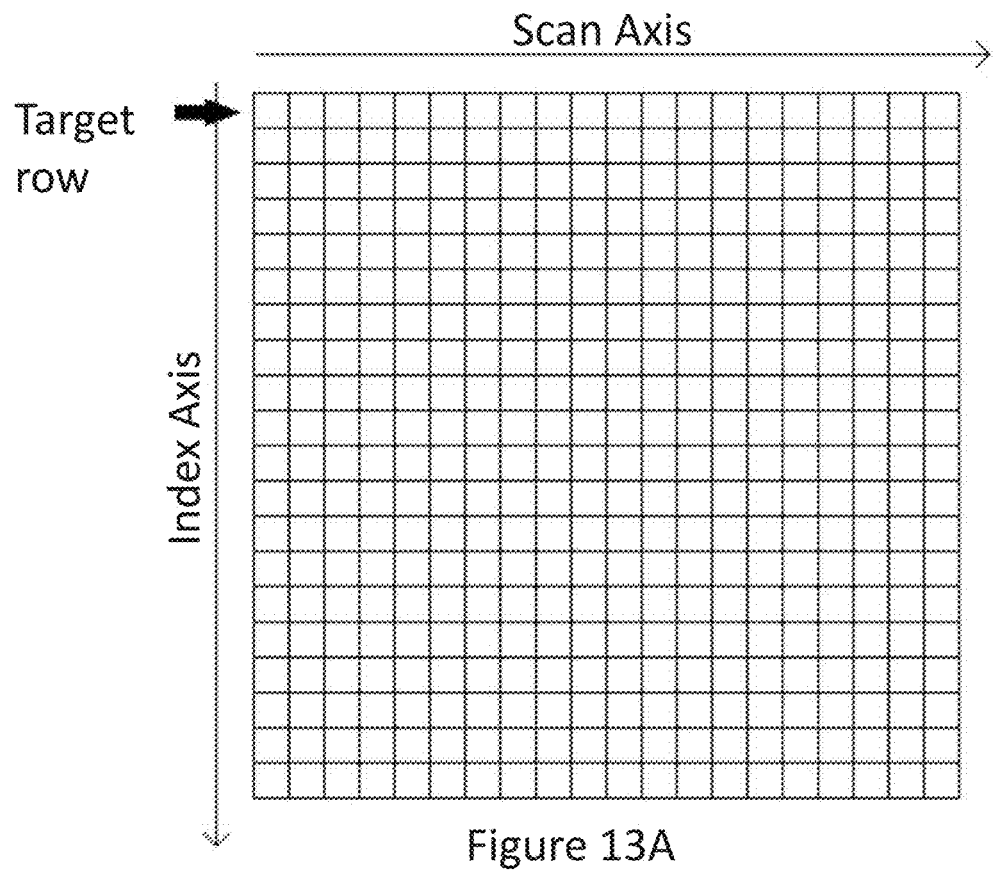
FIGS. 13A to 13N illustrate an example algorithm for defining the scan plan, in accordance with an embodiment of the present technology.
Figure 13B:
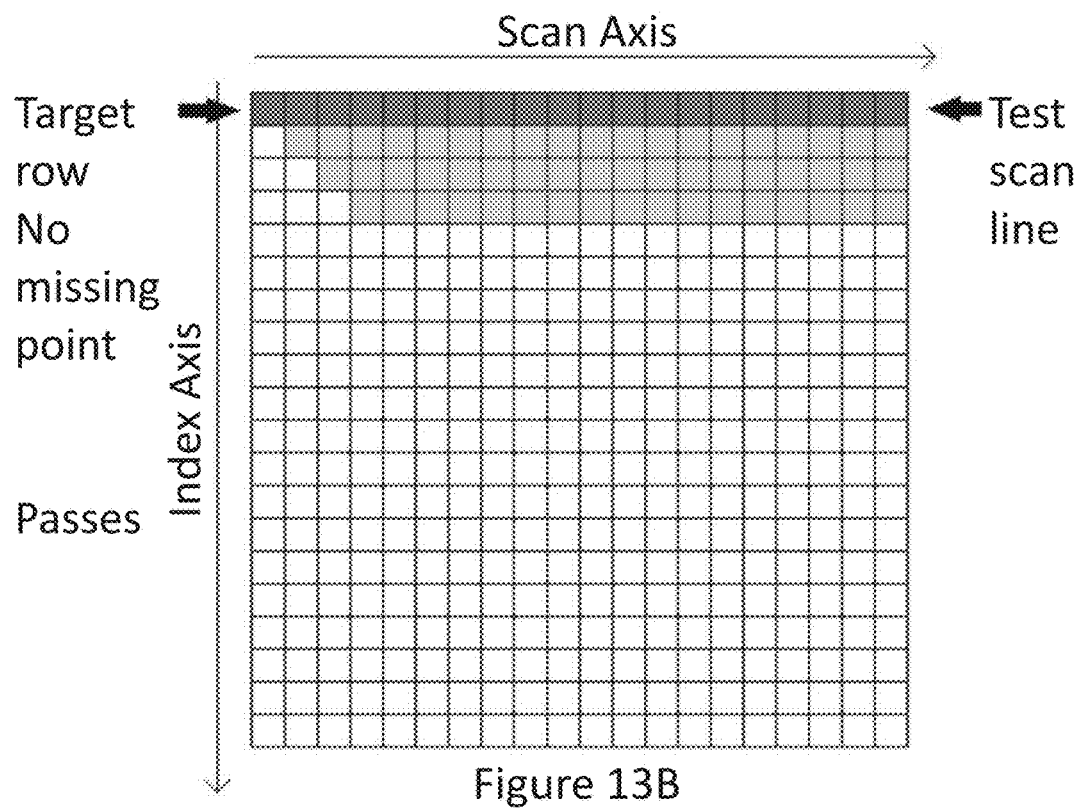
Figure 13C:
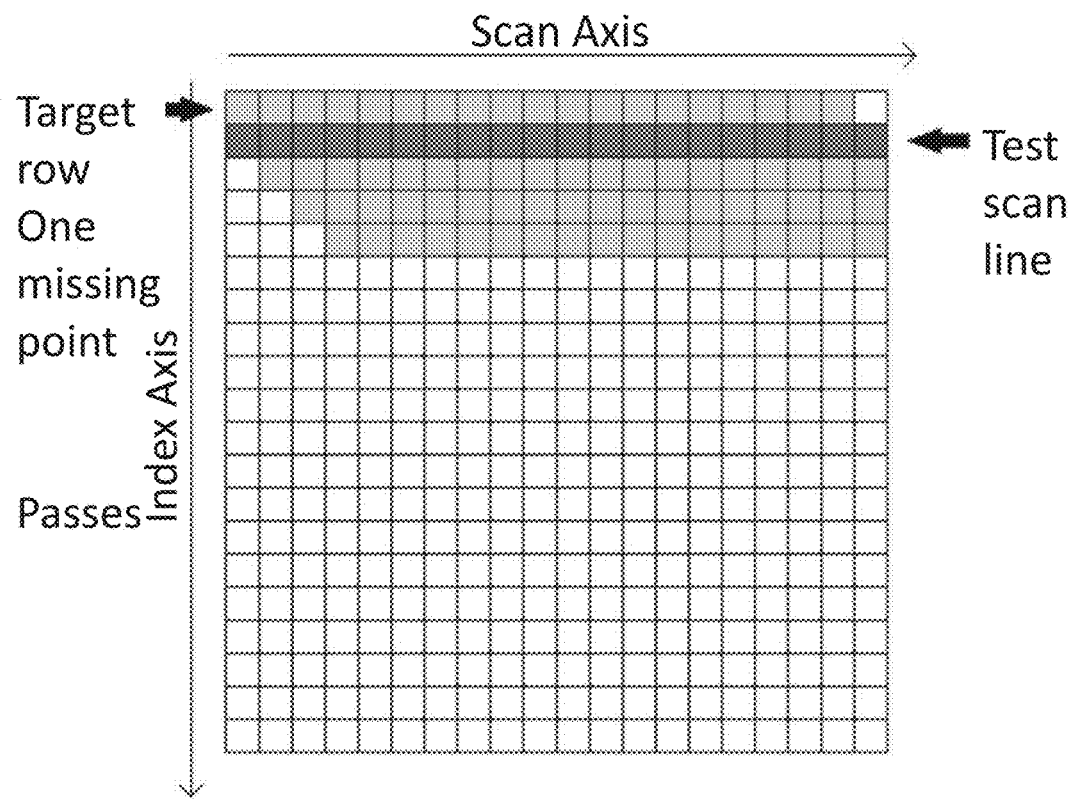
Figure 13D:
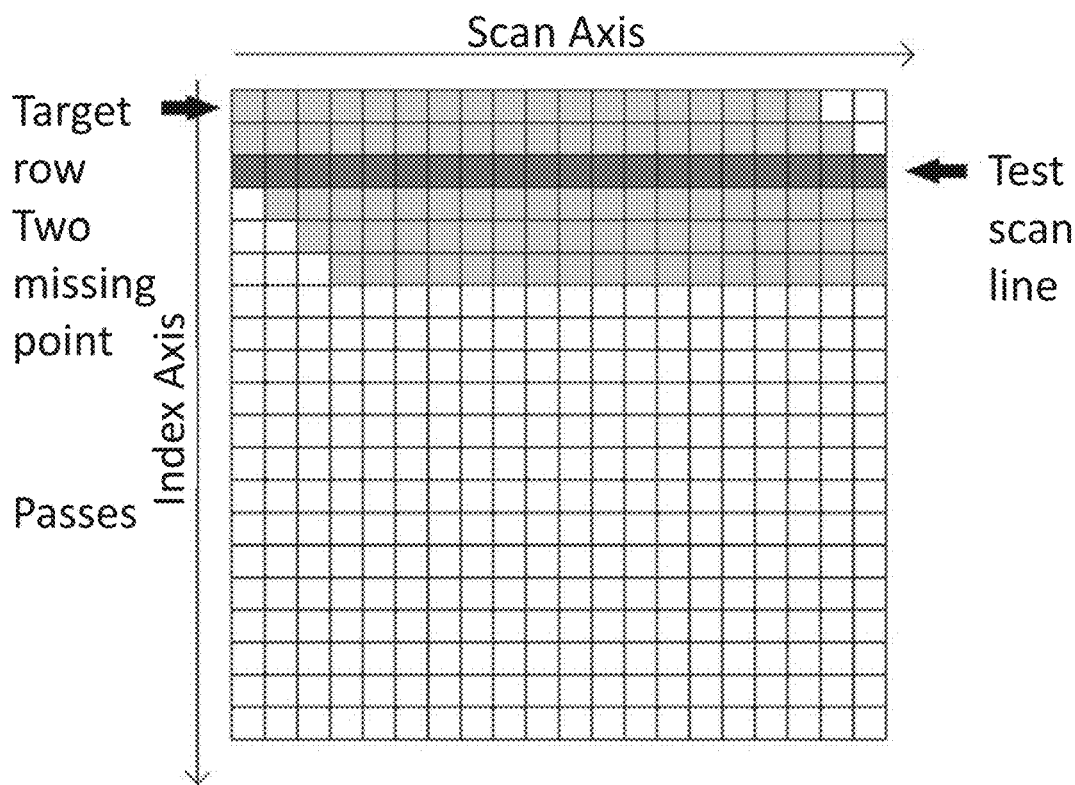
Figure 13E:
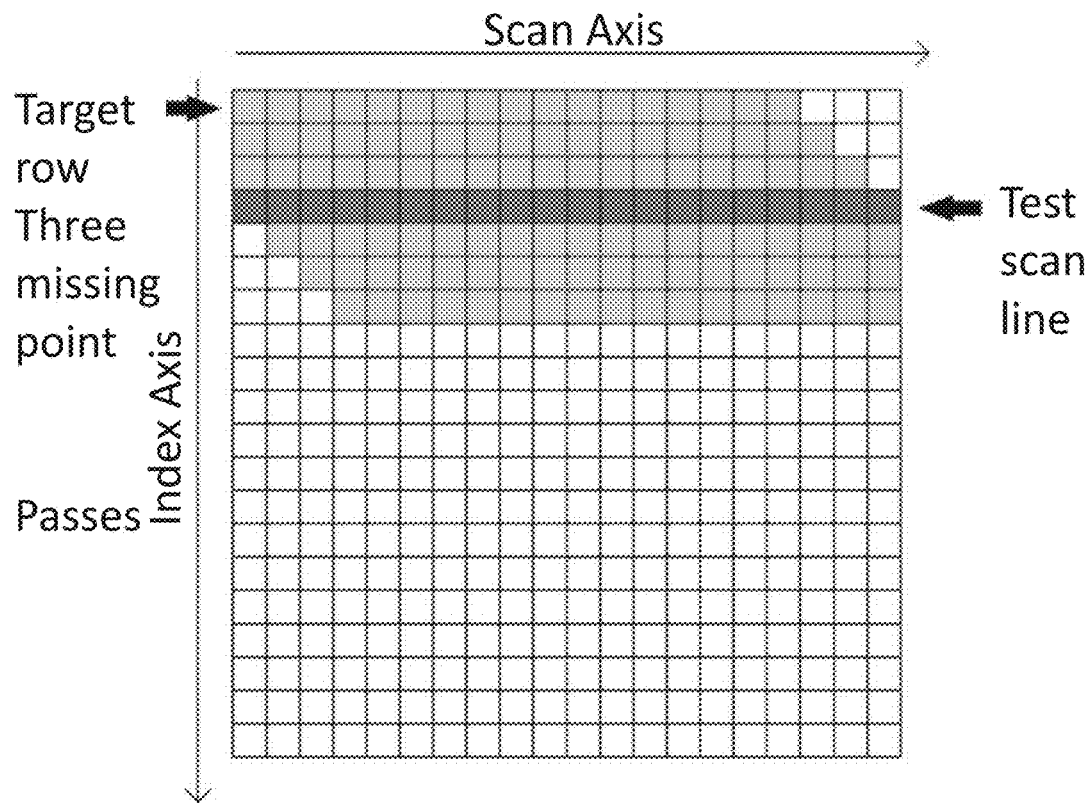
Figure 13F:
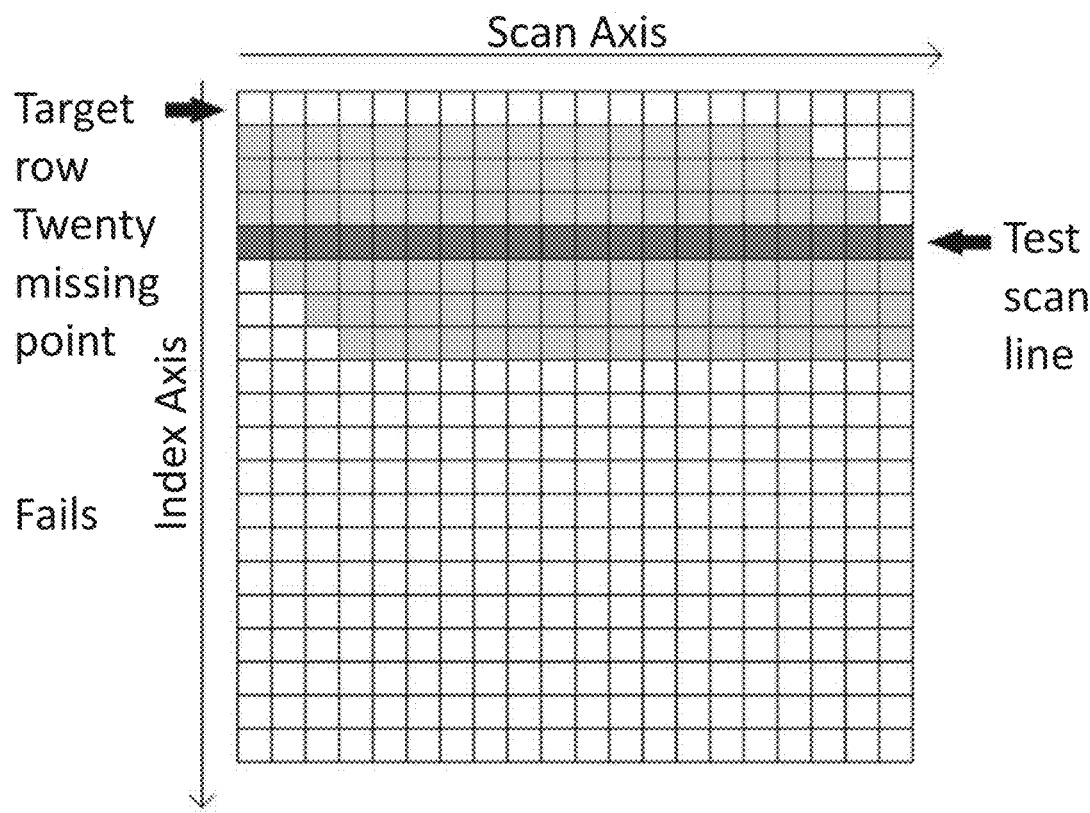
Figure 13G:
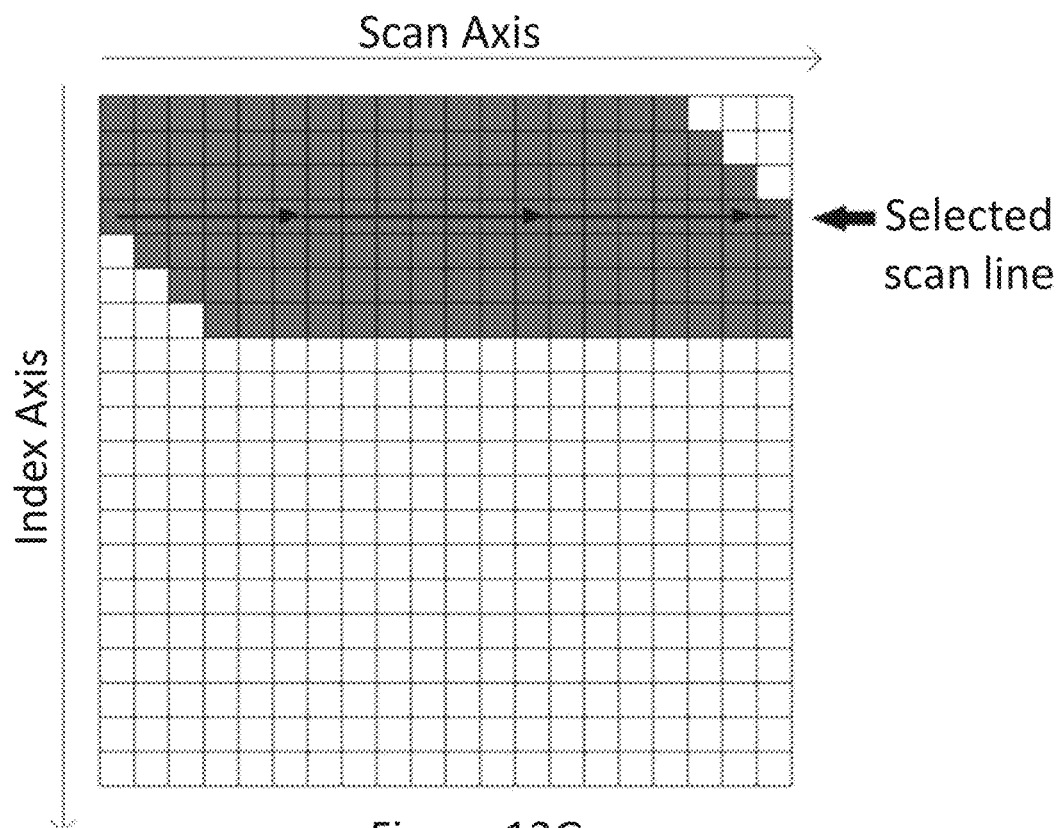
Figure 13H:
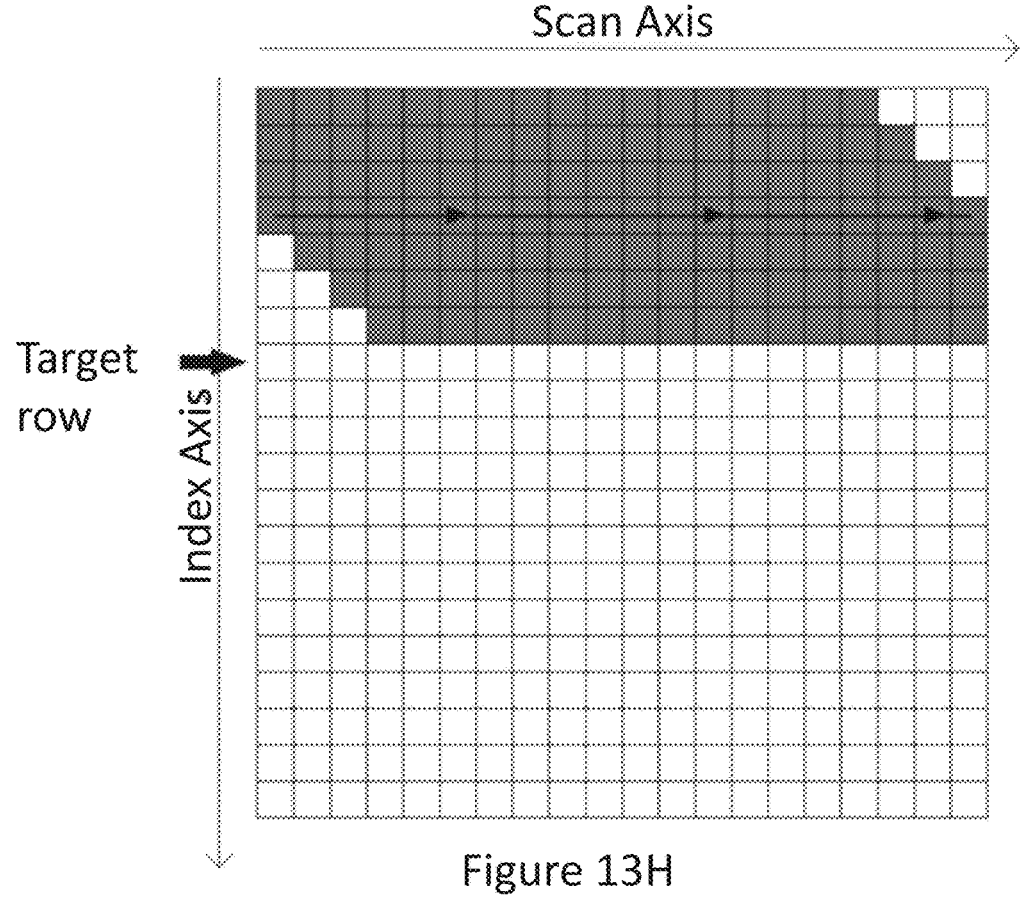
Figure 13I:
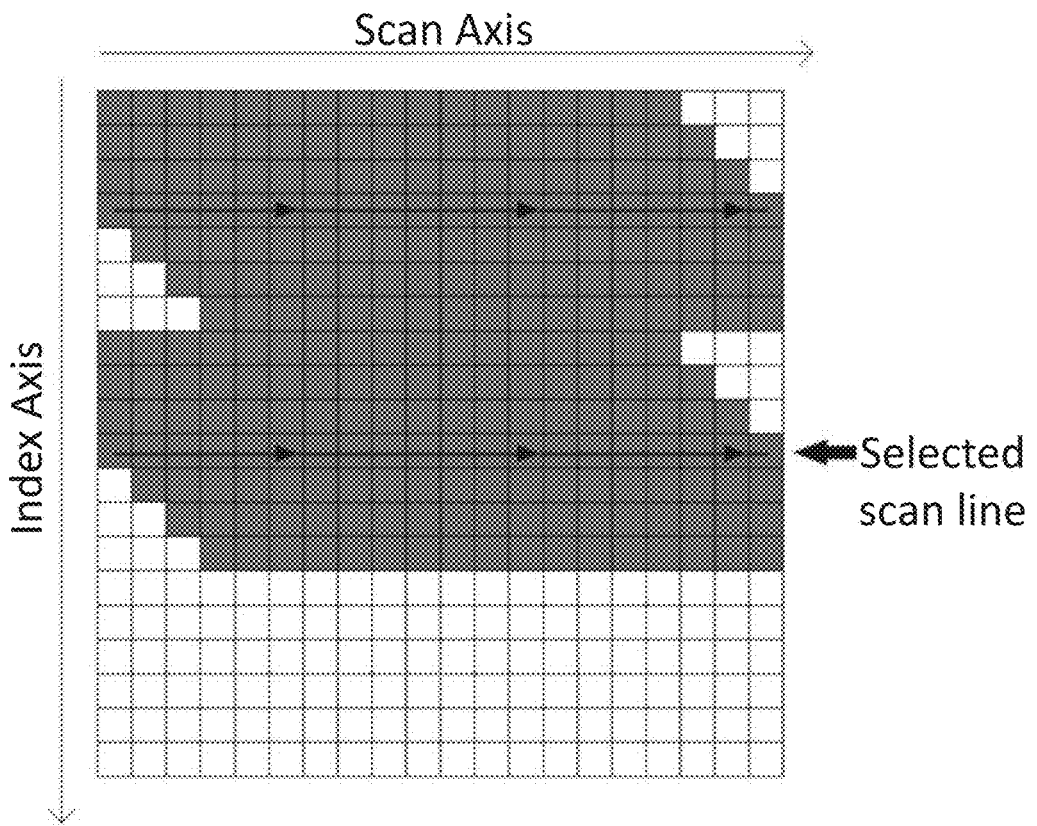
Figure 13J:
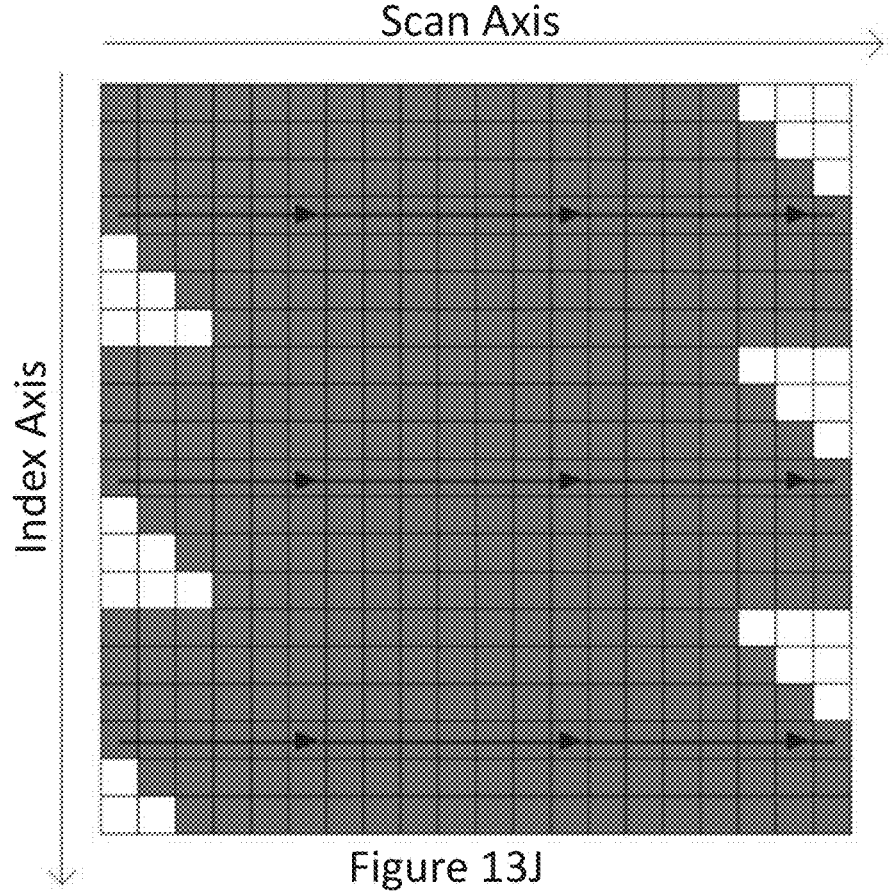
Figure 13K:
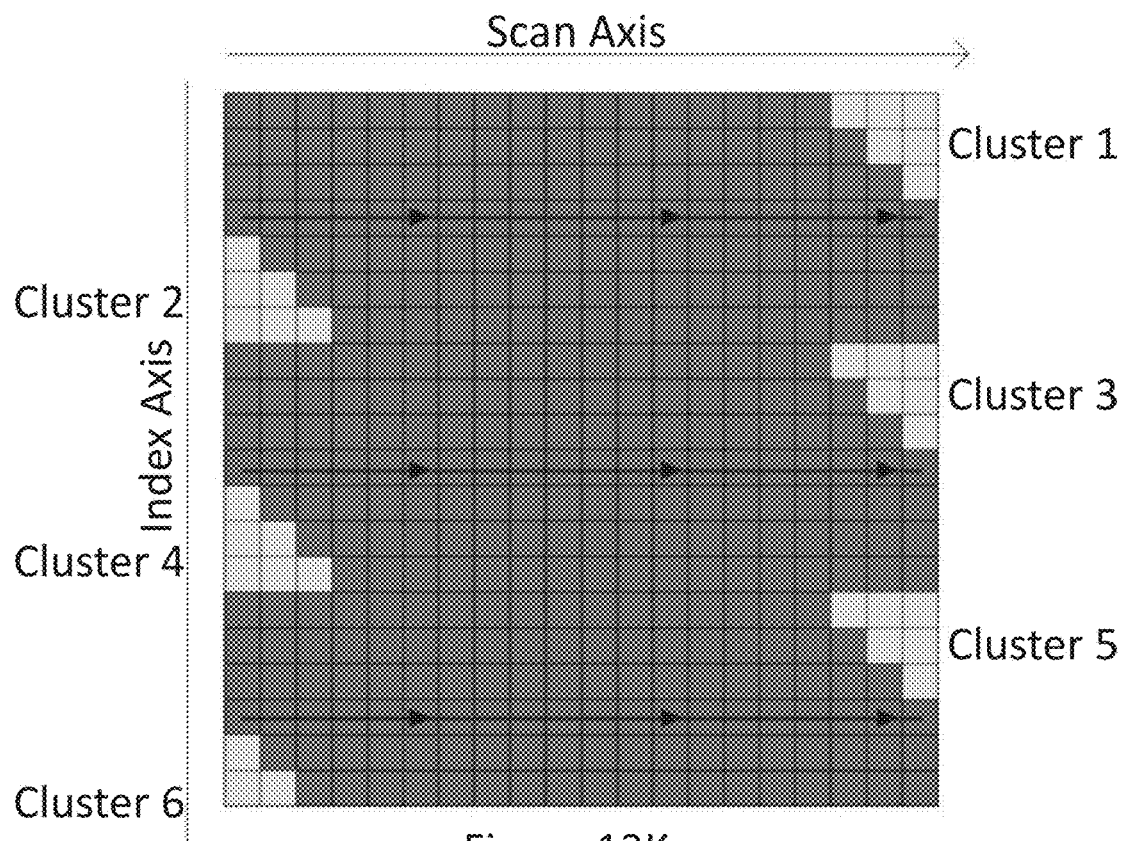
Figure 13L:
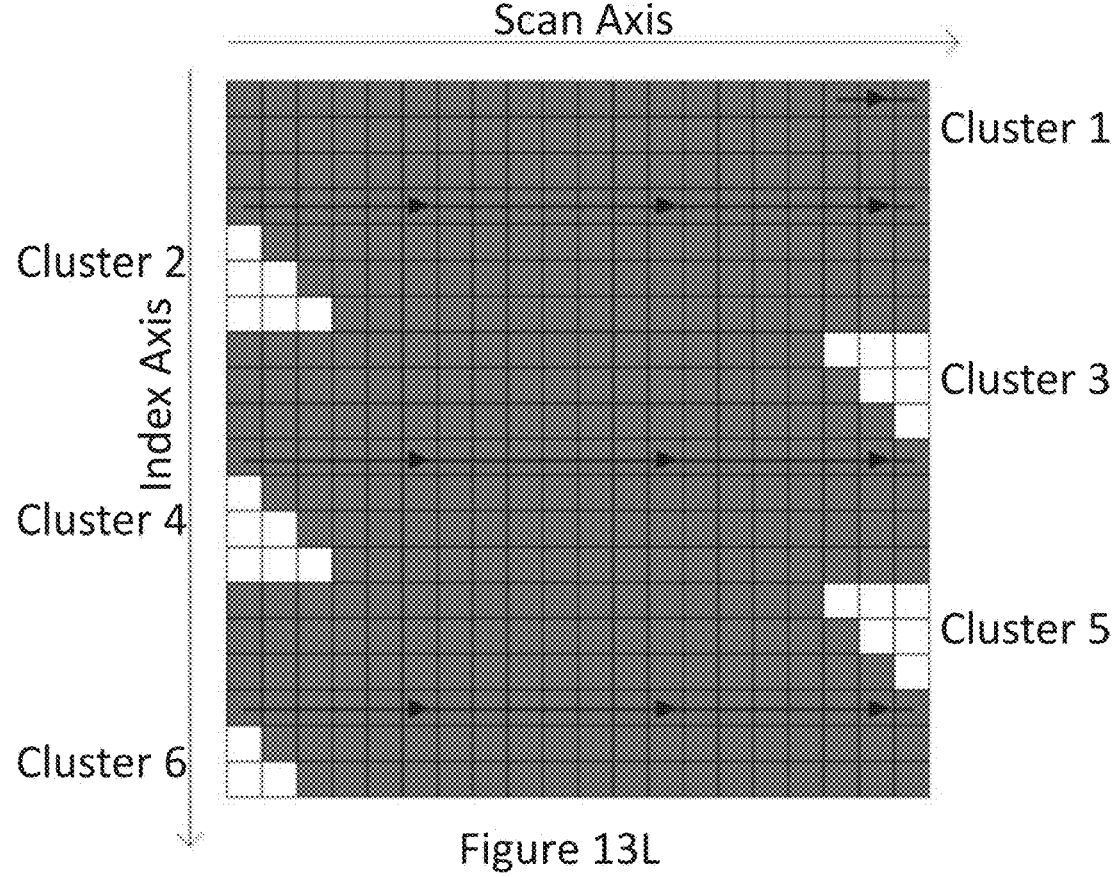
Figure 13M:
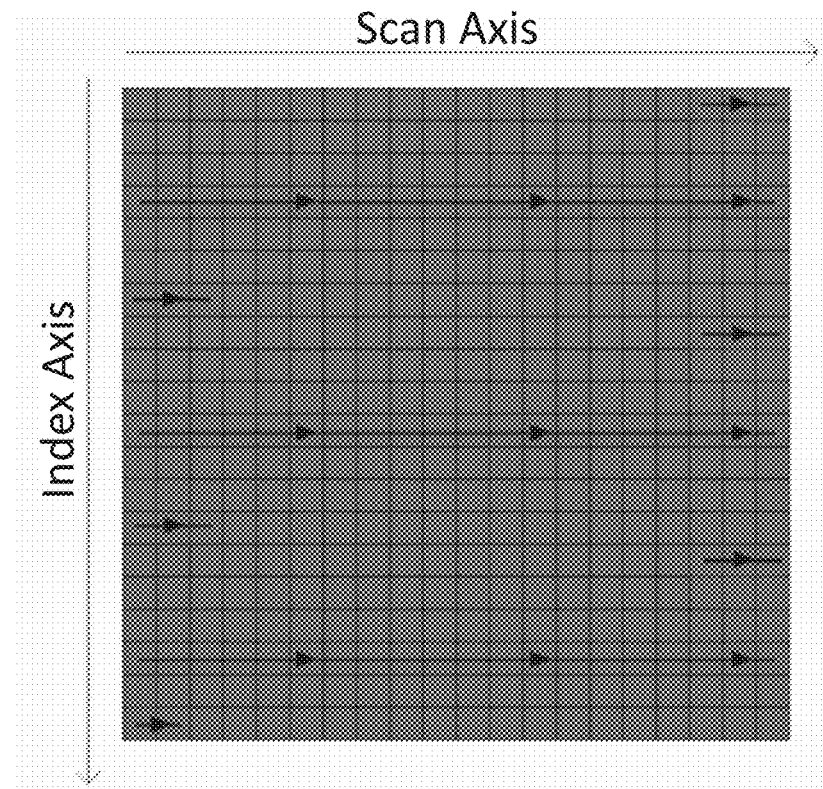
Figure 13N:
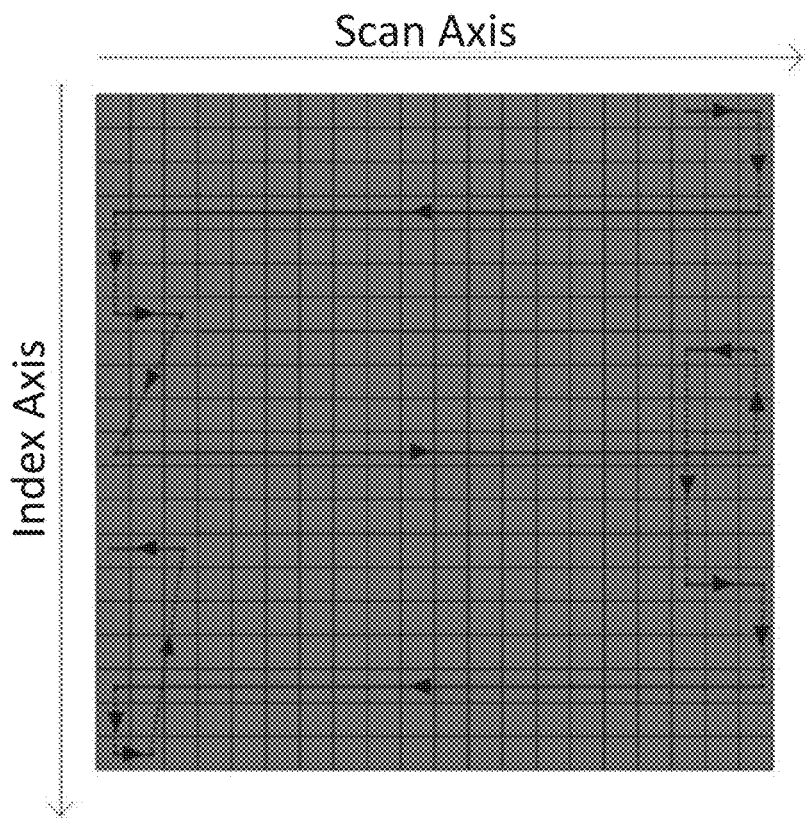

FIGS. 13A to 13N illustrate an example algorithm for defining the scan plan, in accordance with an embodiment of the present technology. The algorithm is performed as follows:

FIG. 13A: The scan plan starts by initializing an empty coverage grid with the same dimensions as the scan data grid. A target row is selected as the first row containing more than nMaxMissing missed grid positions. In the non-limiting example of FIGS. 13A to 13N, nMaxMissing is equal to three.

FIG. 13B: At first, the scan plan algorithm sets the test scan line on the target row. The coverage of the enabled transducers is calculated for all positions of the master transducer over the test scan line. If the coverage results in less or equal than nMaxMissing missed grid positions, the test scan line is marked as acceptable. Note that the test scan line corresponding to the target row is necessarily acceptable since it is scanned by the master transducer, which is consistently positioned and oriented along the direction of incidence of the selected grid positions along the test scan line.

FIGS. 13C to 13F: The process is repeated for the next possible test scan lines. As the test scan lines are selected, the number of missed grid positions on the target row may vary. In the present example, FIG. 13F shows that when the fifth row is selected as the test scan lines, the grid positions on the target row are all missed, being excluded from the groups of grid positions defined for each grid position along the test scan line.

FIG. 13G: Considering the numbers of missed grid positions in FIGS. 13B to 13F, the acceptable test scan line furthest away from the target row, which is the fourth row in the shown example (evaluated in FIG. 13E) is selected as the actual scan line. This scan line is added to the scan plan. The coverage from the enabled transducers along the scan line is added to the coverage grid. In other words, the grid positions that are darkened on FIG. 13G are all part of at least one group of grid positions when the master transducer follows grid positions selected along the actual scan line (fourth row).

FIG. 13H: The next target row is selected as the first row containing more than nMaxMissing missed grid positions. The sequence illustrated on FIGS. 13A to 13G is repeated for the next target row selected on FIG. 13H.

FIGS. 13I and 13J: The acceptable scan line tests are executed again for the next target row, and the process repeats until there are no more target rows left.

FIG. 13K: Sets of missed grid positions are then assembled into clusters of contiguous or proximate grid positions. In this non-limiting example, clusters of missed grid positions are shown on the edges of the coverage matrix. It is however possible to have missed grid positions on any part of the grid, including on the inside of the grid. The following operations of the algorithm are intended to add the empty uncovered grid positions after the building of the scan plan is complete, regardless of the position of the clusters within the grid.

FIG. 13L: A first cluster (Cluster 1) is selected. The same process used to determine the main scan line locations is repeated over the grid positions in this cluster. However in this step, nMaxMissing is set to zero to ensure that no grid position over the selected cluster remains uncovered. A resulting partial scan line for completely scanning the first cluster is added to the scan plan. In the example of FIG. 13L, a single partial scan line is sufficient to fill the cluster. In more complex cases more, multiple partial scan lines defined on different index locations may be defined to completely cover the first cluster.

FIG. 13M: The process is repeated for the remaining clusters, and additional partial scan lines are added to the scan plan to cover all of the clusters. As shown on FIG. 13M, no grid position remains uncovered by the scan plan.

The scan plan may be executed in the same or in another order than the above-described order of its construction. For example and without limitation, one or more of the clusters may be scanned between scanning of the scan lines, as this may allow to minimize moving of the array 30 (or arrays 50 and 52). As shown on FIG. 13, the order and direction of movements of the array 30 over the scan lines may be arranged so that the resulting total path length is minimized. On FIG. 13N, solid lines represent scanning motion where the transducers emit ultrasonic signals and data is collected. Dotted lines represent motions between scan lines where the transducers do not emit ultrasonic signals and no data is collected. Considering FIGS. 13A to 13N, initially allowing a non-zero value of nMaxMissing allows to reduce the total scan time. The effect of this is that the initial scan passes cover a large majority of grid positions, with a modest number of partial scan lines being added to cover the initially uncovered grid positions.

Other algorithms that provide equivalent results as illustrated in FIGS. 13A-13N are also contemplated. In particular, although not shown on FIGS. 13A-13N, the technique illustrated in FIGS. 9A-9E may be combined with the technique illustrated in FIGS. 13A-13N.

Referring again to the example of FIG. 7, when building the scan plan, a first planned displacement of the array 30 is defined along the scan axis, during which the number of enabled transducers 12 of the array 30 remains constant and equal to three transducers 12 along the first planned displacement. After this first planned displacement of the array, a second planned displacement of the array is defined along the index axis to move the array 30 by three grid positions. Thereafter, a third planned displacement is defined along the scan axis, during which the number of enabled transducers 12 of the array 30 remains constant and equal to two transducers 12 along the third planned displacement. The sequence continues until the scan plan is complete for the scanning passes 60 to 68 inclusive.

Considering the sequence 600 of FIG. 11 and its description, the entire sequence may be executed by the controller 300 (FIG. 10A) without any action from the scanning apparatus 200. The skilled reader will therefore appreciate that, for example, operation 640 and sub-operations 642, 644 refer to planned positions and/or orientations of the array 30 and to planned ultrasonic signal and responses because the scan plan may be prepared by the controller 300 prior to the start of its execution using the scanning apparatus 200.

Figure 14:
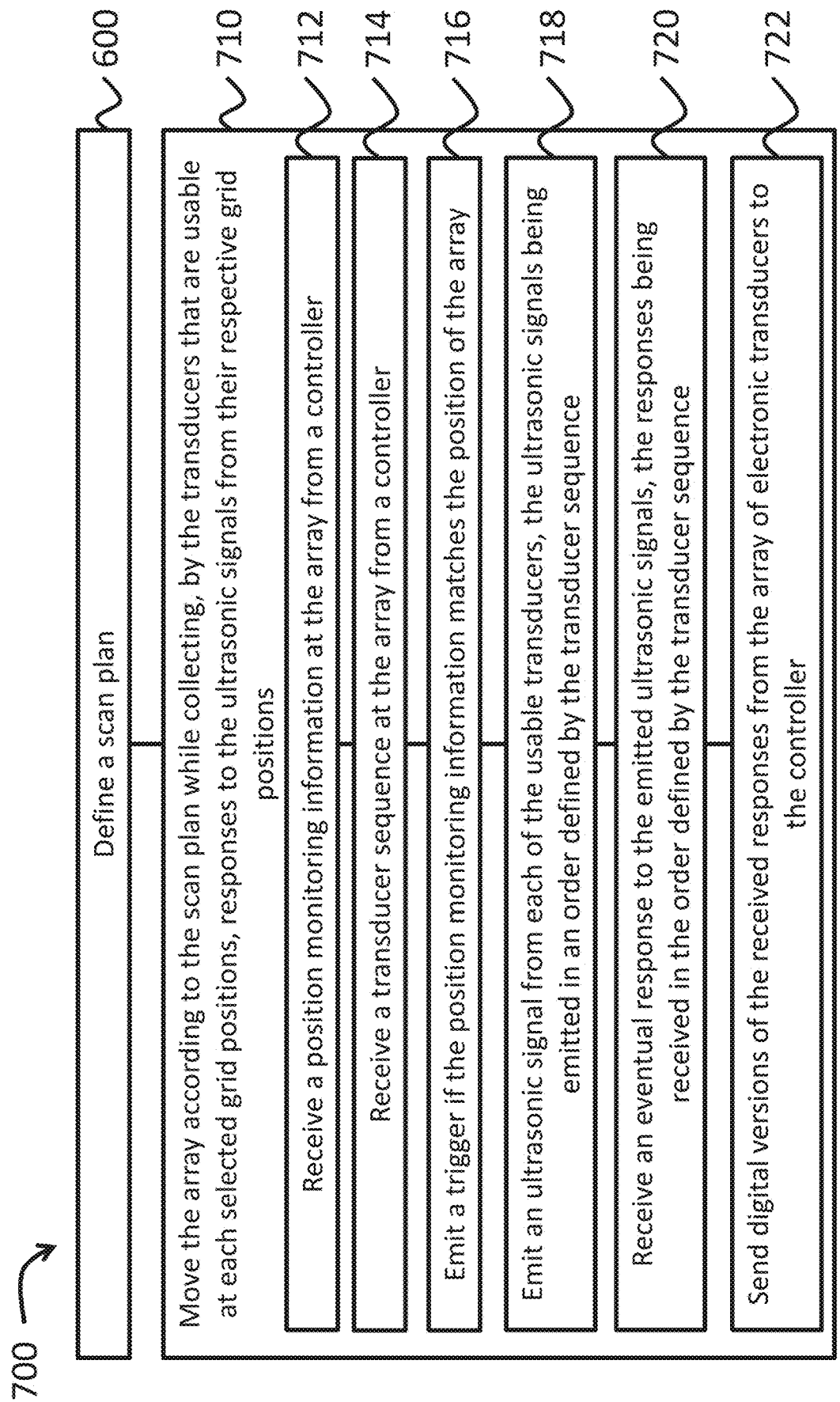
FIG. 14 is a sequence diagram showing operations of a method for scanning an object, in accordance with an embodiment of the present technology.

Execution of the scan plan is described in FIG. 14, which is a sequence diagram showing operations of a method for scanning an object, in accordance with an embodiment of the present technology. On FIG. 14, a sequence 700 comprises a plurality of operations, some of which may be executed in variable order, some of the operations possibly being executed concurrently, some of the operations being optional.

The sequence 700 begins with execution of the sequence 600 to obtain a scan plan for the object to be scanned. The scan plan defined in the sequence 600 may provide coverage for all grid positions defined on the surface of the object. Any time delay may separate the definition of the scan plan and its use in later operations of the sequence 700. For example and without limitation, the same scan plan may be defined for scanning two or more similarly shaped objects. In some embodiments, however, some of the later operations of the sequence 700 may be executed before completion of the sequence 600 that provides the scan plan. Otherwise stated, execution of the sequences 600 and 700 may overlap in time.

At operation 710, the array 30 of transducers 12 is moved according to the scan plan while collecting, by the transducers 12 that are enabled at each selected grid positions, responses to the ultrasonic signals from their respective grid positions. Moving, according to the scan plan, the array 30 in view of the surface of the object may comprise, for example, displacing the array 30 by modifying any one or more of (i) a position of the array 30 along a vertical axis defined by the vertical member 212, (ii) a position of the array along a horizontal axis defined by the horizontal beam 214, (iii) a position of the array 30 along another horizontal axis defined by the length 218 of the basin 220, (iv) a pitch of the array 30, (v) a yaw of the array 30, and (vi) a roll of the array 30.

It will be understood that the array 30 of transducers 12 does not need to be moved for placing the master transducer 12a in view of each of the grid positions defined on the surface 40 of the object. For example and without limitation, by moving the master transducer 12a in view of each of the grid positions selected at operation 630 of the sequence 600, this master transducer 12a will be able to collect eventual responses from the selected grid positions while, concurrently, the other enabled transducers 12 will also be able to collect eventual responses from other grid positions of the respective group of grid positions. Collectively, the groups of grid positions defined at sub-operation 644 and corresponding to each selected position of the master transducer 12a will be able to provide eventual responses from all of the grid positions defined at operation 620 of the sequence 600.

Operation 710 may comprise one or more of sub-operations 712, 714, 716, 718, 720 and 722. At sub-operation 712, the array 30 receives position monitoring information from the controller 300, for example via the trigger module 520. At sub-operation 714, the array 30 receives a transducer sequence from the controller 300, for example via the array controller 550. At sub-operation 716, the position monitoring information is compared by the trigger module 520 with the actual position the array 30 and, provided that the position monitoring information matches the actual position of the array 30, the trigger module 520 emits a trigger for the array 30, the trigger being provided to the trigger input 555 of the array controller 550. At sub-operation 718, in response to having received the trigger and the transducer sequence, the array controller 550 causes each of the enabled transducers to emit an ultrasonic signal, the ultrasonic signals being emitted in an order defined by the transducer sequence. At sub-operation 720, eventual responses may be received, the responses being received at the array 30. If responses are received, they will be received in an order that is consistent with the order defined by the transducer sequence. At sub-operation 722, a digital version of each received response is sent from the array 30 of transducers 12 to the controller 300. In an embodiment, sub-operation 722 may include transmitting, from the array 30 to the controller 300, a digital signal corresponding to each emitted ultrasonic signal defined in the transducer sequence. In that embodiment, if no response indicative of a defect is received at a given transducer 12, an indication may be provided in a corresponding digital signal. The controller 300 may thus receive a number of digital signals equal to a number of emitted ultrasonic signals defined in the transducer sequence to facilitate the identification of actual responses to specific grid positions.

Once the transducer sequence is completed for a given one of the selected grid positions, operation 710 continues when the array 30 reaches a next one of the selected grid positions. Operation 710 may continue until completion of the scan plan. As mentioned hereinabove, the motion of the array 30 may be continuous or substantially continuous, so there is no need to stop the motion at any of the selected grid positions for completing a transducer sequence.

The above description of the sequence 700 is made in the context of the array 30, in which the transducers 12 operate in pulse-echo mode, the eventual responses to the ultrasonic signals resulting from reflections of the ultrasonic signals on defects located underneath the surface of the object. Alternatively, the sequence 700 may be executed in through-transmission mode, involving operation of the array 50 of emitting transducers 54 forming pairs with the receiving transducers 56 of the array 52. In this case, the ultrasonic signals are emitted by the emitting transducers 54 toward a first surface of the object and the ultrasonic signals are received by the receiving transducers 56 from a second surface of the object opposite from the first surface of the object. In this context, the level of curvature of the object at each grid position may be determined by a first level of curvature of the first surface of the object and a second level of curvature on the second surface of the object. Defects located between the first and second surfaces of the object may cause a distortion and/or an attenuation of the ultrasonic signals at the receiving transducers 56. In some cases, a defect may prevent any detection of some of the ultrasonic signals at some of the receiving transducers 56.

Each of the operations of the sequences 600 and 700 performed by the controller 300 may be configured to be processed by one or more processors, the one or more processors being coupled to a memory. FIG. 15 is a block diagram of a controller of the system for scanning an object using multiple channels, in accordance with an embodiment of the present technology.

The controller 300 comprises a processor or a plurality of cooperating processors (represented as a single processor 810 for simplicity), a memory device or a plurality of memory devices (represented as a single memory device 820 for simplicity), an input/output device or a plurality of input/output devices (represented as an input/output device 830 for simplicity). Separate input and output devices may be present instead of the input/output device 830. The input/output device 830 may be adapted communicate with the motion controller 216, the array controller 550, and the trigger module 520, for providing control instructions to these components of the scanning apparatus 200 and for receiving feedback signals from these components of the scanning apparatus 200. The memory device 820 may comprise a database 824 for storing data which may include, for example, the surface representation of an object to be scanned and the scan plan for scanning the object.

The processor 810 is operatively connected to the memory device 820 and to the input/output device 830. The memory device 820 may comprise a non-transitory computer-readable medium 822 for storing code instructions that are executable by the processor 300 to perform the operations of the sequences 600 and 700.

Those of ordinary skill in the art will realize that the description of the system and method for scanning an object using an array of ultrasonic transducers are illustrative only and are not intended to be in any way limiting. Other embodiments will readily suggest themselves to such persons with ordinary skill in the art having the benefit of the present disclosure. Furthermore, the disclosed system and method may be customized to offer valuable solutions to existing needs and problems related to the rapid scanning, with precision, of objects having complex shape. In the interest of clarity, not all of the routine features of the implementations of the system and method are shown and described. In particular, combinations of features are not limited to those presented in the foregoing description as combinations of elements listed in the appended claims form an integral part of the present disclosure. It will, of course, be appreciated that in the development of any such actual implementation of the system and method, numerous implementation-specific decisions may need to be made in order to achieve the developer's specific goals, such as compliance with application-, system-, and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of non-destructive testing having the benefit of the present disclosure.

In accordance with the present disclosure, the components, process operations, and/or data structures described herein may be implemented using various types of operating systems, computing platforms, network devices, computer programs, and/or general-purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of operations is implemented by a computer, a processor operatively connected to a memory, or a machine, those operations may be stored as a series of instructions readable by the machine, processor or computer, and may be stored on a non-transitory, tangible medium.

Systems and modules described herein may comprise software, firmware, hardware, or any combination(s) of software, firmware, or hardware suitable for the purposes described herein. Software and other modules may be executed by a processor and reside on a memory of servers, workstations, personal computers, computerized tablets, personal digital assistants (PDA), and other devices suitable for the purposes described herein. Software and other modules may be accessible via local memory, via a network, via a browser or other application or via other means suitable for the purposes described herein. Data structures described herein may comprise computer files, variables, programming arrays, programming structures, or any electronic information storage schemes or methods, or any combinations thereof, suitable for the purposes described herein.

The present disclosure has been described in the foregoing specification by means of non-restrictive illustrative embodiments provided as examples. These illustrative embodiments may be modified at will. The scope of the claims should not be limited by the embodiments set forth in the examples, but should be given the broadest interpretation consistent with the description as a whole.

What is claimed is:

1. A method for preparing a scan plan for scanning an object using an array of ultrasonic transducers, comprising:
   a) defining a plurality of grid positions on a surface of the object;
   b) selecting a grid position;
   c) identifying, for the selected grid position, (i) one or more enabled transducers of the array and (ii) a corresponding group of one or more grid positions, the identifying comprising, for each given transducer of the array:
      evaluating a direction of incidence of a planned ultrasonic signal emitted by the given transducer on a respective grid position on the surface of the object when the array is planned to be positioned according to the selected grid position,
      evaluating a difference between the direction of incidence and a surface normal vector defined on the surface of the object at the respective grid position, and in response to the difference being less than a threshold, marking the given transducer as enabled at the selected grid position and including the respective grid position in the group of grid positions corresponding to the selected grid position;

d) repeating b) and c) by selecting a new grid position at each repetition of b) until all of the grid positions defined on the surface of the object are included in at least one of the groups of grid positions; and e) defining the scan plan to include all of the selected grid positions.

2. The method of claim 1, further comprising:
designating one of the transducers of the array as a master transducer; and
for each successive selected grid position, calculating a planned position, a planned orientation, or a planned position and a planned orientation of the array so that the direction of incidence of a planned ultrasonic signal emitted by the master transducer is aligned with a surface normal vector defined on the surface of the object at the selected grid position;
wherein the enabled transducers of the array of ultrasonic transducers and the corresponding group of grid positions are identified, at each successive selected grid position, according to the calculated position, orientation, or position and orientation of the array.

3. The method of claim 2, wherein the scan plan comprises the calculated position, orientation, or position and orientation of the array in view of the surface of the object at each of the selected grid positions.

4. The method of claim 1, wherein:
selecting a grid position comprises selecting a plurality of grid positions along a scan line;
for each of the plurality of grid positions along the scan line, angles of incidence of planned ultrasonic signals from each transducer of the array are evaluated for respective grid positions and; and
for each of the plurality of grid positions along the scan line, the respective grid positions are included in a corresponding group of grid positions in response to marking given transducers as enabled at the respective grid positions.

5. The method of claim 1, wherein the scan plan comprises:
a first planned displacement of the array along a first axis, a first number of enabled transducers of the array being constant along the first planned displacement, the enabled transducers of the first number being planned to emit ultrasonic signals and to collect eventual responses over the respective grid positions along the first planned displacement;
after the first planned displacement of the array, a second planned displacement of the array along a second axis, the second planned displacement moving the array by a number of grid positions equal to the first number of enabled transducers; and
after the second planned displacement, a third planned displacement along the first axis, a second number of enabled transducers of the array being constant along the third planned displacement, the enabled transducers of the second number being planned to emit ultrasonic signals and to collect eventual responses over the respective grid positions along the third displacement.

6. The method of claim 1, wherein the number of enabled transducers is variable between each successive selected grid positions.

7. The method of claim 1, wherein the plurality of grid positions entirely represents the surface of the object.

8. A method for scanning an object using an array of ultrasonic transducers, comprising:
defining a scan plan using the method as defined in claim 1; and
moving the array according to the scan plan while collecting, by the transducers that are enabled at each selected grid position, eventual responses to the ultrasonic signals from their respective grid positions.

9. The method of claim 8, wherein each transducer of the array is configured to operate in pulse-echo mode, the eventual responses to the ultrasonic signals being echoes reflected by defects located beneath the surface of the object.

10. The method of claim 8, further comprising:
for each selected grid position:
receiving a transducer sequence at the array,
emitting an ultrasonic signal from each of the enabled transducers, the ultrasonic signals being emitted in an order defined by the transducer sequence, and
following receiving a response to any one of the emitted ultrasonic signals, sending a digital version of the response from the array to the controller.

11. The method of claim 8, wherein the array comprises an array of mono-element transducers.

12. The method of claim 8, wherein the array comprises phased array transducers.

13. The method of claim 8, wherein moving, according to the scan plan, the array in view of the surface of the object comprises displacing the array by modifying any one or more of (i) a position of the array along a first axis, (ii) a position of the array along a second axis distinct from the first axis, (iii) a position of the array along a third axis distinct from the first and second axes, (iv) a pitch of the array, (v) a yaw of the array, and (vi) a roll of the array.

14. A method for scanning an object using an array of ultrasonic transducers, comprising:
defining a scan plan using the method as defined in claim 1; and
moving the array according to the scan plan;
wherein:
each transducer of the array comprises a pair including an emitting transducer and a receiving transducer,
the ultrasonic signals are emitted by enabled emitting transducers toward a first surface of the object,
the ultrasonic signals are detected in through-transmission mode by receiving transducers corresponding to the enabled emitting transducers, and
the ultrasonic signals are received at the receiving transducers from a second surface of the object opposite from the first surface of the object.

15. The method of claim 14, wherein the emitting transducer of a given pair is determined to be enabled at a given grid position at least in part based on a first surface normal vector defined on the first surface of the object at the given grid position and on a second surface normal vector defined on the second surface of the object at a position opposite from the given grid position.

16. The method of claim 14, further comprising analysing the ultrasonic signals received at the receiving transducers corresponding to the enabled transducers in order to detect an eventual defect in the object.

17. The method of claim 16, further comprising:
for each selected grid position:
receiving a transducer sequence at the array, emitting an ultrasonic signal from each of the enabled emitting transducers, the ultrasonic signals being emitted in an order defined by the transducer sequence, and following detecting a defect in the object, sending a digital version of the ultrasonic signal indicating the defect from the array to the controller.

18. The method of claim 14, wherein the array comprises an array of mono-element transducers.

19. The method of claim 14, wherein the array comprises phased array transducers.

20. The method of claim 14, wherein moving, according to the scan plan, the array in view of the surface of the object comprises displacing the array by modifying any one or more of (i) a position of the array along a first axis, (ii) a position of the array along a second axis distinct from the first axis, (iii) a position of the array along a third axis distinct from the first and second axes, (iv) a pitch of the array, (v) a yaw of the array, and (vi) a roll of the array.

21. A system for scanning an object using an array of ultrasonic transducers, comprising:

an array of ultrasonic transducers adapted to emit ultrasonic signals on a surface of the object and to detect responses to the ultrasonic signals;

a robotic manipulator supporting the array of ultrasonic transducers;

a motion controller adapted to control the robotic manipulator for positioning the array of ultrasonic transducers;

a controller operatively connected to the array of ultrasonic transducers and to the motion controller, the controller comprising a processor; and a non-transitory computer-readable medium storing code instructions that are executable by the processor to control operation of the method as defined in claim 1.

22. A system for scanning an object using an array of ultrasonic transducers, comprising:

an array of emitting ultrasonic transducers adapted to emit ultrasonic signals toward a first surface of the object;

an array of receiving transducers adapted to detect the ultrasonic signals, the ultrasonic signals being detected in through-transmission mode and being received at the receiving transducers from a second surface of the object opposite from the first surface of the object;

a first robotic manipulator supporting the array of emitting ultrasonic transducers;

a second robotic manipulator supporting the array of receiving ultrasonic transducers;

a motion controller adapted to control the first and second robotic manipulator for positioning of the arrays of emitting and receiving ultrasonic transducers;

a controller operatively connected to the arrays of emitting and receiving ultrasonic transducers and to the motion controller, the controller comprising a processor; and a non-transitory computer-readable medium storing code instructions that are executable by the processor to control operation of the method as defined in claim 14.

* * * * *